(12) United States Patent
Wang et al.

(10) Patent No.: US 12,538,182 B2
(45) Date of Patent: Jan. 27, 2026

(54) METHOD FOR SPLITTING END-TO-END QOS REQUIREMENT INFORMATION, TERMINAL, AND NETWORK SIDE DEVICE

(71) Applicant: VIVO MOBILE COMMUNICATION CO., LTD., Guangdong (CN)

(72) Inventors: Wen Wang, Guangdong (CN); Zhenhua Xie, Guangdong (CN); Qian Zheng, Guangdong (CN); Xiaowan Ke, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 423 days.

(21) Appl. No.: 18/153,523

(22) Filed: Jan. 12, 2023

(65) Prior Publication Data

US 2023/0171645 A1 Jun. 1, 2023

Related U.S. Application Data

(63) Continuation of application No. PCT/CN2021/109709, filed on Jul. 30, 2021.

(30) Foreign Application Priority Data

Jul. 31, 2020 (CN) .......................... 202010769219.3

(51) Int. Cl.
*H04W 28/24* (2009.01)
*H04W 88/04* (2009.01)

(52) U.S. Cl.
CPC ............ *H04W 28/24* (2013.01); *H04W 88/04* (2013.01)

(58) Field of Classification Search
CPC . H04W 28/24; H04W 88/04; H04W 28/0268; H04W 28/0864; H04W 28/0925; H04W 28/0967; H04W 4/70; H04W 40/22
See application file for complete search history.

(56) References Cited

U.S. PATENT DOCUMENTS

| | | | | |
|---|---|---|---|---|
| 2018/0279319 A1* | 9/2018 | Yu | .......................... | H04W 40/12 |
| 2021/0274585 A1* | 9/2021 | Yu | .......................... | H04L 67/146 |
| 2021/0345237 A1* | 11/2021 | Ge | .......................... | H04W 76/14 |
| 2022/0174582 A1* | 6/2022 | Rao | ....................... | H04W 76/14 |

(Continued)

FOREIGN PATENT DOCUMENTS

| | | | | |
|---|---|---|---|---|
| CN | 106470491 A | * | 3/2017 | .......... H04W 72/542 |
| CN | 108307472 A | | 7/2018 | |

(Continued)

OTHER PUBLICATIONS

Qualcomm Incorporated: "KI#3, New solution to support end-to-end QoS for Layer-3 UE-to-Network Relay", 3GPP Draft; S2-2004728, 3rd Generation Partnership Project (3GPP), vol. SA WG2, No. E (e-meeting); Jun. 3, 2020 (Jun. 3, 2020) (Year: 2020).*

(Continued)

*Primary Examiner* — Yuwen Pan
*Assistant Examiner* — Swati Jain
(74) *Attorney, Agent, or Firm* — Price Heneveld LLP

(57) ABSTRACT

A method for splitting end-to-end QoS requirement information, a terminal, and a network side device, the method comprising: a target device splits end-to-end QoS requirement information into PC5-segment QoS information and Uu-segment QoS information, the target device comprising a target UE and an access network device.

19 Claims, 17 Drawing Sheets

(56) References Cited

U.S. PATENT DOCUMENTS

| | | | | |
|---|---|---|---|---|
| 2022/0240122 A1* | 7/2022 | Liu | ............................ | H04W 4/50 |
| 2022/0369164 A1* | 11/2022 | Hu | ............................ | H04W 40/22 |

FOREIGN PATENT DOCUMENTS

| | | |
|---|---|---|
| CN | 111432457 A | 7/2020 |
| JP | 2023516245 A | 4/2023 |
| WO | 2020103811 A1 | 5/2020 |
| WO | 2021164017 A1 | 8/2021 |

OTHER PUBLICATIONS

Qualcomm Incorporated: "KI#3, New solution to support end-to-end QoS for Layer-3 UE-to-Network Relay", 3GPP Draft; S2-2004728, 3RD Generation Partnership Project (3GPP), vol. Sa WG2, No. E (e-meeting); Jun. 3, 2020 (2020-06-13) ( Year: 2020).*

Nokia, Alcatel •—Lucent Shanghai Bell, Bearer modelling and E2E QoS support for layer 2 relaying, 3GPP RAN WG2 Mtg #98 R2, 1704325, May 5, 2017 (Year: 2017).*

OPPO "KI#3, New Sol: QOS handling for Layer—3 UE—to-Network Relay" S2-2003945, Jun. 2020 (Year: 2020).*

Qualcomm Incorporated, "KI#3, New solution to support end-to end QoS for Layer-3 UE-to-Network Relay", S2-2004728, SA WG2 Meeting #139E, Jun. 1-12, 2020, Elbonia, E-Meeting.

Nokia, Alcatel-Lucent Shanghai Bell, "Bearer modelling and E2E QoS support for layer-2 relaying", R2-1704325, 3GPP TSG-RAN WG2 Meeting #98, May 15-19, 2017, Hangzhou, China.

OPPO, KI#3, New Sol: QoS handling for Layer-3 UE-to-Network Relay, Approval, FS_5G_ProSe / Rel-17, 3GPP SA WG2 Meeting #139E, S2-2003945, Jun. 1-12, 2020, Elbonia.

Qualcomm Incorporated, KI#3, New solution to support end-to-end QoS for Layer-3 UE-to-Network Relay, Discussion/ Approval, 5G_ProSe/Rel. 17, SA WG2 Meeting #139E (e-meeting), S2-2004289, Jun. 1-12, 2020, Elbonia.

* cited by examiner

METHOD FOR SPLITTING END-TO-END QOS REQUIREMENT INFORMATION, TERMINAL, AND NETWORK SIDE DEVICE

CROSS-REFERENCE TO RELATED APPLICATIONS

This application is a continuation application of PCT International Application No. PCT/CN2021/109709 filed on Jul. 30, 2021, which claims priority to Chinese Patent Application 202010769219.3, filed in China on Jul. 31, 2020. All of the disclosures are incorporated herein by reference in their entireties.

TECHNICAL FIELD

This disclosure pertains to the field of communications technologies, and specifically relates to a method for splitting end-to-end quality of service QoS requirement information, a terminal, and a network-side device.

BACKGROUND

In the related art, in a relay communication process, end-to-end communication quality needs to satisfy a quality of service (QoS) requirement of a service. Specifically, in the relay communication process, a network-side device may generate Uu-segment QoS information based on a related rule (for example, a policy and charging control rule, PCC) or a local policy configuration, and send the Uu-segment QoS information to relay UE. After receiving the Uu-segment QoS information, the relay UE may convert the Uu-segment QoS information into a PC5-segment QoS parameter based on a mapping relationship configured by the network-side device for terminal UE, thereby satisfying the end-to-end QoS requirement.

Currently, because only service requirements provided by the network-side device are considered, application scenarios that satisfy the QoS requirements are relatively limited.

SUMMARY

According to a first aspect, a method for splitting end-to-end QoS requirement information is provided. The method includes: splitting, by a target device, end-to-end QoS requirement information into PC5-segment QoS information and Uu-segment QoS information, where the target device includes target UE and an access network device.

According to a second aspect, a method for splitting end-to-end QoS requirement information is provided. The method includes: sending, by a core network device, end-to-end QoS requirement information to an access network device, where the end-to-end QoS requirement information includes an end-to-end QoS requirement text.

According to a third aspect, a method for splitting end-to-end QoS requirement information is provided. The method includes: splitting, by a target core network device, end-to-end QoS requirement information to obtain PC5-segment QoS information and Uu-segment QoS information; and before the splitting, by a target core network device, end-to-end QoS requirement information, receiving the end-to-end QoS requirement information from relay UE, where the end-to-end QoS requirement information is sent by remote UE to the relay UE; or after the splitting, by a target core network device, end-to-end QoS requirement information, sending the PC5-segment QoS information and the Uu-segment QoS information to an access network device, where the PC5-segment QoS information includes a PC5-segment QoS parameter and a PC5-segment QoS attribute, the PC5-segment QoS parameter includes a PQI, and the PC5-segment QoS attribute includes a PDB; and the Uu-segment QoS information includes a Uu-segment QoS parameter and a Uu-segment QoS attribute, the Uu-segment QoS parameter includes a 5QI, and the Uu-segment QoS attribute includes a PDB.

According to a fourth aspect, a method for splitting end-to-end QoS requirement information is provided. The method includes: receiving, by an access network device, PC5-segment QoS information and Uu-segment QoS information from a target core network device, where the PC5-segment QoS information and the Uu-segment QoS information are obtained by splitting end-to-end QoS requirement information; and establishing, by the access network device, a PC5-segment bearer and a Uu-segment bearer based on the PC5-segment QoS information and the Uu-segment QoS information.

According to a fifth aspect, a method for splitting end-to-end QoS requirement information is provided. The method includes: receiving, by relay UE, end-to-end QoS requirement information from remote UE; and sending, by the relay UE, the end-to-end QoS requirement information to a target core network device.

According to a sixth aspect, an apparatus for splitting end-to-end QoS requirement information is provided. The apparatus includes a splitting module, where the splitting module is configured to split end-to-end QoS requirement information into PC5-segment QoS information and Uu-segment QoS information, where a target device includes target UE and an access network device.

According to a seventh aspect, an apparatus for splitting end-to-end QoS requirement information is provided. The apparatus includes a sending module, where the sending module is configured to send end-to-end QoS requirement information to an access network device, where the end-to-end QoS requirement information includes an end-to-end QoS requirement text.

According to an eighth aspect, an apparatus for splitting end-to-end QoS requirement information is provided. The apparatus includes a splitting module, a receiving module, and a sending module, where the splitting module is configured to split end-to-end QoS requirement information to obtain PC5-segment QoS information and Uu-segment QoS information; and the receiving module is configured to receive the end-to-end QoS requirement information from relay UE before the splitting module splits the end-to-end QoS requirement information, where the end-to-end QoS requirement information is sent by remote UE to the relay UE; or the sending module is configured to send the PC5-segment QoS information and the Uu-segment QoS information to an access network device after the target core network device splits the end-to-end QoS requirement information, where the PC5-segment QoS information includes a PC5-segment QoS parameter and a PC5-segment QoS attribute, the PC5-segment QoS parameter includes a PQI, and the PC5-segment QoS attribute includes a PDB; and the Uu-segment QoS information includes a Uu-segment QoS parameter and a Uu-segment QoS attribute, the Uu-segment QoS parameter includes a 5QI, and the Uu-segment QoS attribute includes a PDB.

According to a ninth aspect, an apparatus for splitting end-to-end QoS requirement information is provided. The apparatus includes a receiving module and an establishing module, where the receiving module is configured to receive PC5-segment QoS information and Uu-segment QoS information from a target core network device, where the PC5-segment QoS information and the Uu-segment QoS information are obtained by splitting end-to-end QoS requirement information; and the establishing module is configured to establish a PC5-segment bearer and a Uu-segment bearer based on the PC5-segment QoS information and the Uu-segment QoS information.

According to a tenth aspect, an apparatus for splitting end-to-end QoS requirement information is provided. The apparatus includes a receiving module and a sending module, where the receiving module is configured to receive end-to-end QoS requirement information from remote UE; and the sending module is configured to send the end-to-end QoS requirement information received by the receiving module to a target core network device.

According to an eleventh aspect, a terminal is provided. The terminal includes a processor, a memory, and a program or instructions stored in the memory and capable of running on the processor, where when the program or instructions are executed by the processor, the step of the method according to the first aspect is implemented, or the step of the method according to the second aspect is implemented, or the steps of the method according to the third aspect are implemented, or the steps of the method according to the fourth aspect are implemented, or the steps of the method according to the fifth aspect are implemented.

According to a twelfth aspect, a network-side device is provided. The network-side device includes a processor, a memory, and a program or instructions stored in the memory and capable of running on the processor, where when the program or instructions are executed by the processor, the step of the method according to the first aspect is implemented, or the step of the method according to the second aspect is implemented, or the steps of the method according to the third aspect are implemented, or the steps of the method according to the fourth aspect are implemented, or the steps of the method according to the fifth aspect are implemented.

According to a thirteenth aspect, a readable storage medium is provided. The readable storage medium stores a program or instructions, and when the program or instructions are executed by a processor, the step of the method according to the first aspect is implemented, or the step of the method according to the second aspect is implemented, or the steps of the method according to the third aspect are implemented, or the steps of the method according to the fourth aspect are implemented, or the steps of the method according to the fifth aspect are implemented.

According to a fourteenth aspect, a chip is provided. The chip includes a processor and a communications interface, the communications interface is coupled to the processor, and the processor is configured to run a program or instructions to implement the step of the method according to the first aspect, or the step of the method according to the second aspect, or the steps of the method according to the third aspect, or the steps of the method according to the fourth aspect, or the steps of the method according to the fifth aspect.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this disclosure are used to distinguish between similar objects instead of describing a specific order or sequence. It should be understood that the terms used in this way are interchangeable in appropriate circumstances, so that the embodiments of this disclosure can be implemented in other orders than the order illustrated or described herein. In addition, objects distinguished by "first" and "second" usually fall within one class, and a quantity of objects is not limited. For example, there may be one or more first objects. In addition, the term "and/or" in the specification and claims indicates at least one of connected objects, and the character "/" generally represents an "or" relationship between associated objects.

It should be noted that technologies described in the embodiments of this disclosure are not limited to a long term evolution (LTE)/LTE-Advanced (LTE-A) system, and can also be used in other wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this disclosure are usually used interchangeably. The described technologies may be used for the foregoing systems and radio technologies, and may also be used for other systems and radio technologies. However, in the following descriptions, a new radio (NR) system is described for an illustration purpose, and NR terms are used in most of the following descriptions, although these technologies may also be applied to other systems than the NR system, for example, a 6th Generation (6G) communications system.

Figure 1:
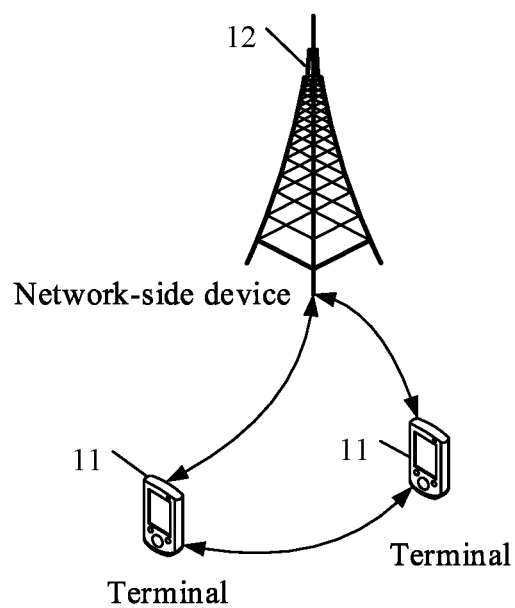
FIG. 1 is a schematic diagram of a possible structure of a communications system according to an embodiment of this disclosure.

FIG. 1 is a block diagram of a wireless communications system to which an embodiment of this disclosure may be applied. The wireless communications system includes a terminal 11 and a network-side device 12. The terminal 11 may also be referred to as a terminal device or user equipment (UE). The terminal 11 may be a terminal-side device such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device, vehicular user equipment (VUE), or pedestrian user equipment (PUE). The wearable device includes a smart band, an earphone, glasses, or the like. It should be noted that a specific type of the terminal 11 is not limited in the embodiments of this disclosure. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception point (TRP), or another appropriate term in the art, as long as the same technical effect is achieved. The base station is not limited to specific technical terms. It should be noted that in the embodiments of this disclosure, only a base station in an NR system is used as an example, but a specific type of the base station is not limited.

The methods for splitting end-to-end QoS requirement information according to the embodiments of this disclosure are hereinafter described in detail by using specific embodiments and application scenarios thereof with reference to the accompanying drawings.

Figure 2:
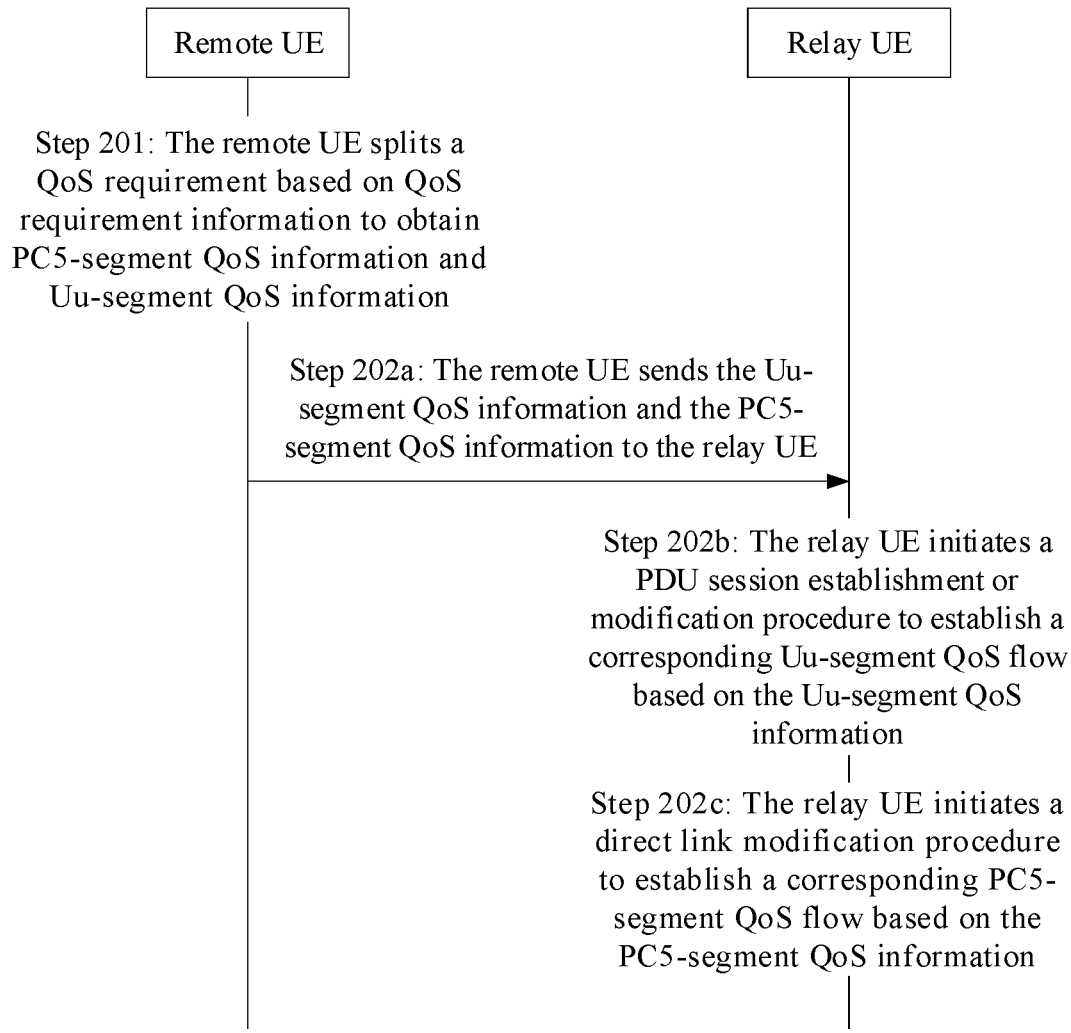
FIG. 2 is a first schematic flowchart of a method for splitting end-to-end QoS requirement information according to an embodiment of this disclosure.

FIG. 2 is a schematic flowchart of a method for splitting end-to-end QoS requirement information according to an embodiment of this disclosure. The method for splitting end-to-end QoS requirement information may include step 201.

Step 201: A target device splits end-to-end QoS requirement information into PC5-segment QoS information and Uu-segment QoS information.

In this embodiment of this disclosure, the target device includes target UE and an access network device.

For example, the target UE may be remote UE (Remote UE), and may further include relay UE (Relay UE).

For example, the access network device may include a radio access network (RAN) device.

In this embodiment of this disclosure, the end-to-end QoS requirement information may be a priority requirement, a delay requirement, a reliability requirement, or the like required by a relay service. In an example, the end-to-end QoS requirement information may be a QoS parameter and a QoS attribute corresponding to an end-to-end QoS requirement to be satisfied when data is sent from the remote UE to a UPF (user plane function) anchor point, such as a 5QI, a guaranteed flow bit rate, a maximum flow bit rate, a delay, or a packet error rate.

In this embodiment of this disclosure, the end-to-end QoS requirement information may be end-to-end QoS requirement information in a case that the remote UE establishes an indirect link with a network-side device through the relay UE.

In this embodiment of this disclosure, when the relay UE is included between two ends in this disclosure, to satisfy the end-to-end QoS requirement information, the QoS requirement information needs to be split into the PC5-segment QoS information and the Uu-segment QoS information. The QoS information between the remote UE and the relay UE is the PC5-segment QoS information, and the QoS information between the relay UE and network-side device is the Uu-segment QoS information. Due to indirect interface communication through the relay, an end-to-end QoS guarantee needs to be supported in segments. If there is no corresponding PC5-segment QoS information and Uu-segment QoS information that can specifically support the end-to-end QoS guarantee, a network side cannot perform accurate radio resource allocation to satisfy the end-to-end QoS requirement. Therefore, in this application, by splitting the end-to-end QoS requirement information, communication quality of the indirect interface communication can be guaranteed.

In the method for splitting end-to-end QoS requirement information according to this embodiment of this disclosure, the target device splits the end-to-end QoS requirement information into the PC5-segment QoS information and the Uu-segment QoS information. In this way, an entity that splits the end-to-end QoS requirement information is no longer limited to the network-side device, and further, splitting scenarios can be diversified and enriched. Therefore, it is convenient to split the end-to-end QoS requirement information in any scenario.

Optionally, in this embodiment of this disclosure, the PC5-segment QoS information includes a PC5-segment QoS parameter and a PC5-segment QoS attribute; and the Uu-segment QoS information includes a Uu-segment QoS parameter and a Uu-segment QoS attribute.

For example, the PC5-segment QoS parameter may include a PQI, and the PC5-segment QoS attribute may include a PDB; the Uu-segment QoS parameter may include a 5QI; and the Uu-segment QoS attribute may include a PDB.

For example, the PC5-segment QoS parameter may further include a maximum flow bit rate (MFBR) or a guaranteed flow bit rate (GFBR); the PC5-segment QoS attribute may further include a packet error rate (PER); the Uu-segment QoS parameter includes a PC5 QoS identifier (PQI), an MFBR, or a GFBR; and the Uu-segment QoS attribute includes a PER.

Optionally, in this embodiment of this disclosure, the PC5-segment QoS information and the Uu-segment QoS information satisfy the end-to-end QoS requirement information.

For example, the satisfying the end-to-end QoS requirement information may be: the split PC5-segment QoS information and Uu-segment QoS information satisfy the end-to-end QoS requirement information.

In an example, that the split PC5-segment QoS information satisfies the end-to-end QoS requirement information may be: the split PC5-segment QoS parameter satisfies an end-to-end QoS parameter; and the split PC5-segment QoS attribute satisfies an end-to-end QoS attribute. For example, the split PC5-segment PDB satisfies an end-to-end PDB.

In another example, that the split Uu-segment QoS information satisfies the end-to-end QoS requirement information may be: the split Uu-segment QoS parameter satisfies an end-to-end QoS parameter; and the split Uu-segment QoS attribute satisfies an end-to-end QoS attribute. For example, the split Uu-segment PDB satisfies an end-to-end PDB.

For example, after the target device splits the end-to-end QoS requirement information, an obtained combination of the PC5-segment QoS parameter/attribute and the Uu-segment QoS parameter/attribute needs to satisfy the end-to-end QoS requirement. For example, using a packet delay budget (PDB) in the end-to-end QoS requirement information as an example, a sum of the PC5-segment PDB and the Uu-segment PDB should be less than or equal to the PDB required in the end-to-end QoS requirement information, as described in the following example 1.

Example 1: When one relay UE is included between the remote UE and the UPF anchor point (that is, end-to-end), to satisfy the QoS requirement information between the remote UE and the UPF anchor point, the QoS requirement information needs to be split into the PC5-segment QoS information and the Uu-segment QoS information. If the PDB in the end-to-end QoS requirement information is 100 ms, after the target device splits the QoS requirement information between the remote UE and the UPF anchor point, the PC5-segment PDB between the remote UE and the relay UE (that is, the PC5-segment QoS information) may be 20 ms, and the Uu-segment PDB (that is, the Uu-segment QoS information) between the relay UE and the UPF anchor point may be 80 ms. In this way, when information is transmitted between the remote UE and the UPF, after the information passes through a PC5 segment and a Uu segment, PDBs of the PC5 segment and the Uu segment still satisfy the requirement that the PDB in the QoS requirement information between the remote UE and the UPF anchor point should be 100 ms.

In this way, after the target device splits the end-to-end QoS requirement information, the split PC5-segment QoS information and Uu-segment QoS information still satisfy the end-to-end QoS requirement information, ensuring completion of normal transmission.

FIG. 2 is a schematic flowchart of a method for splitting end-to-end QoS requirement information according to an embodiment of this disclosure. The method for splitting end-to-end QoS requirement information may include step 202a to step 202c.

For example, in a case that the target UE is the remote UE, after step 201, the method for splitting end-to-end QoS requirement information according to this disclosure may further include the following step 202a to step 202c.

Step 202a: The remote UE sends the Uu-segment QoS information and the PC5-segment QoS information to the relay UE.

Step 202b: The relay UE initiates a PDU session establishment or modification procedure to establish a corresponding Uu-segment QoS flow based on the Uu-segment QoS information.

Step 202c: The relay UE initiates a direct link modification procedure to establish a corresponding PC5-segment QoS flow based on the PC5-segment QoS information.

For example, when the target device is the remote UE, the remote UE may split the end-to-end QoS requirement information into the PC5-segment QoS information and the Uu-segment QoS information. The PC5-segment QoS information may be PC5-segment QoS configuration information, and the Uu-segment QoS information may be Uu-segment QoS configuration information.

In an example, the PC5-segment QoS configuration information may be used to indicate a QoS parameter (for example, PQI, MFBR, or GFBR) and a QoS attribute (for example, PDB or PER) of a PC5-segment QoS flow between the remote UE and the relay UE.

In an example, the Uu-segment QoS configuration information may be used to indicate a QoS parameter (for example, PQI, MFBR, or GFBR) and a QoS attribute (for example, PDB or PER) of a QoS flow between the relay UE and the network-side device (for example, the UPF).

For example, in the process in which the remote UE sends the Uu-segment QoS information and the PC5-segment QoS information to the relay UE, the remote UE may send the Uu-segment QoS information and the PC5-segment QoS information to the relay UE by using a direct link modification request message.

Figure 3:
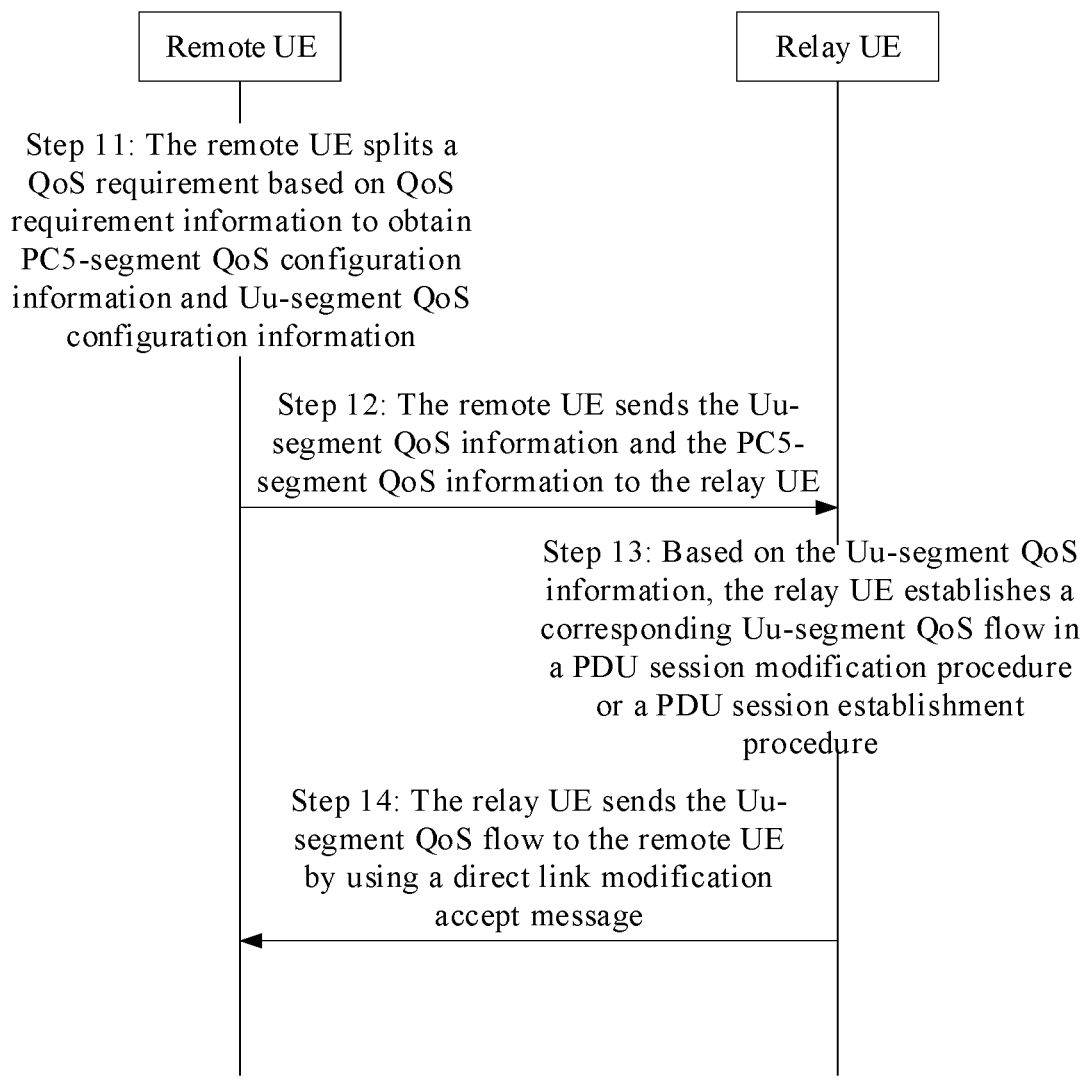
FIG. 3 is a second schematic flowchart of a method for splitting end-to-end QoS requirement information according to an embodiment of this disclosure.

Example 1: In a case of relay communication, it is assumed that the target device is the remote UE. As shown in FIG. 3, the technical solution to splitting end-to-end QoS requirement information by the remote UE includes the following steps.

Step 11: The remote UE splits the end-to-end QoS requirement information into PC5-segment QoS configuration information (that is, the PC5-segment QoS information) and Uu-segment QoS configuration information (that is, the Uu-segment QoS information).

Step 12: The remote UE sends the split PC5-segment QoS configuration information and Uu-segment QoS configuration information to the relay UE.

Step 13: Based on the Uu-segment QoS configuration information provided by the remote UE, the relay UE may establish a corresponding Uu-segment QoS flow in a PDU session modification procedure or a PDU session establishment procedure.

Step 14: The relay UE initiates a direct link modification procedure based on the PC5-segment QoS configuration information provided by the remote UE, and establishes a corresponding PC5-segment QoS flow with the remote UE.

In this way, when the target device is the remote UE, the remote UE can complete the process of splitting the end-to-end QoS requirement information by itself, and the network side does not need to participate in the splitting, thereby reducing signaling overheads.

Figure 4:
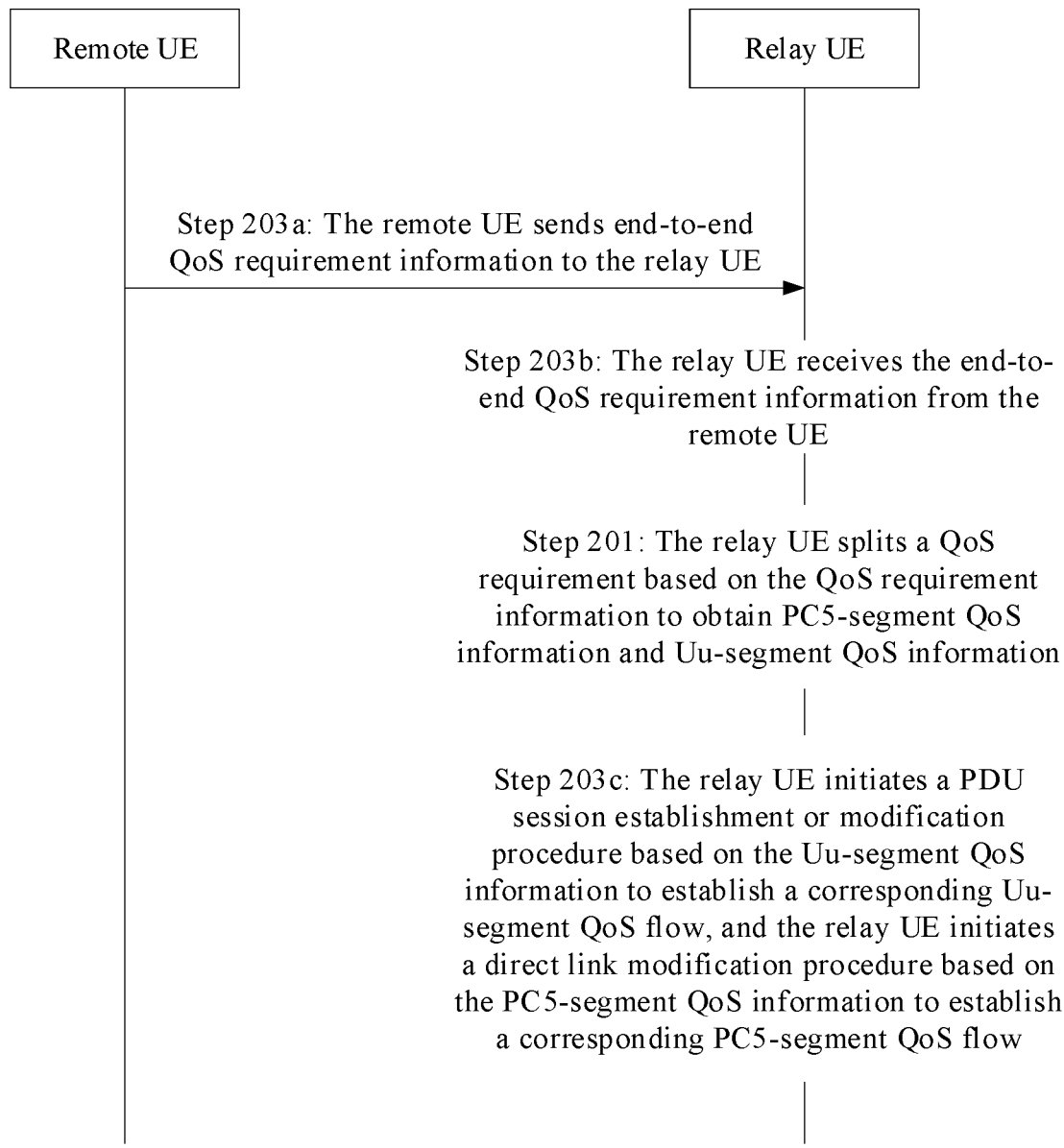
FIG. 4 is a third schematic flowchart of a method for splitting end-to-end QoS requirement information according to an embodiment of this disclosure.

FIG. 4 is a schematic flowchart of a method for splitting end-to-end QoS requirement information according to an embodiment of this disclosure. The method for splitting end-to-end QoS requirement information may include step 203a to step 203c.

For example, in a case that the target UE is the relay UE, before step 201, the method for splitting end-to-end QoS requirement information according to this disclosure may further include the following step 203a and step 203b.

Step 203a: The remote UE sends the end-to-end QoS requirement information to the relay UE.

Step 203b: The relay UE receives the end-to-end QoS requirement information from the remote UE.

Based on step 203, after step 201, the method for splitting end-to-end QoS requirement information according to this disclosure may further include the following step 203c.

Step 203c: The relay UE initiates a PDU session establishment or modification procedure based on the Uu-segment QoS information to establish a corresponding Uu-segment QoS flow, and the relay UE initiates a direct link modification procedure based on the PC5-segment QoS information to establish a corresponding PC5-segment QoS flow.

For example, the link modification procedure is used to modify link information of a direct link between the remote UE and the relay UE.

For example, the end-to-end QoS requirement information may be carried in a direct link modification request message (direct link modification request).

In an example, the PC5-segment QoS configuration information may be used to indicate a QoS parameter (for example, PQI, MFBR, or GFBR) and a QoS attribute (for example, PDB or PER) of a PC5-segment QoS flow between the remote UE and the relay UE.

In an example, the Uu-segment QoS configuration information may be used to indicate a QoS parameter (for example, PQI, MFBR, or GFBR) and a QoS attribute (for example, PDB or PER) of a QoS flow between the relay UE and the network-side device (for example, the UPF).

Figure 5:
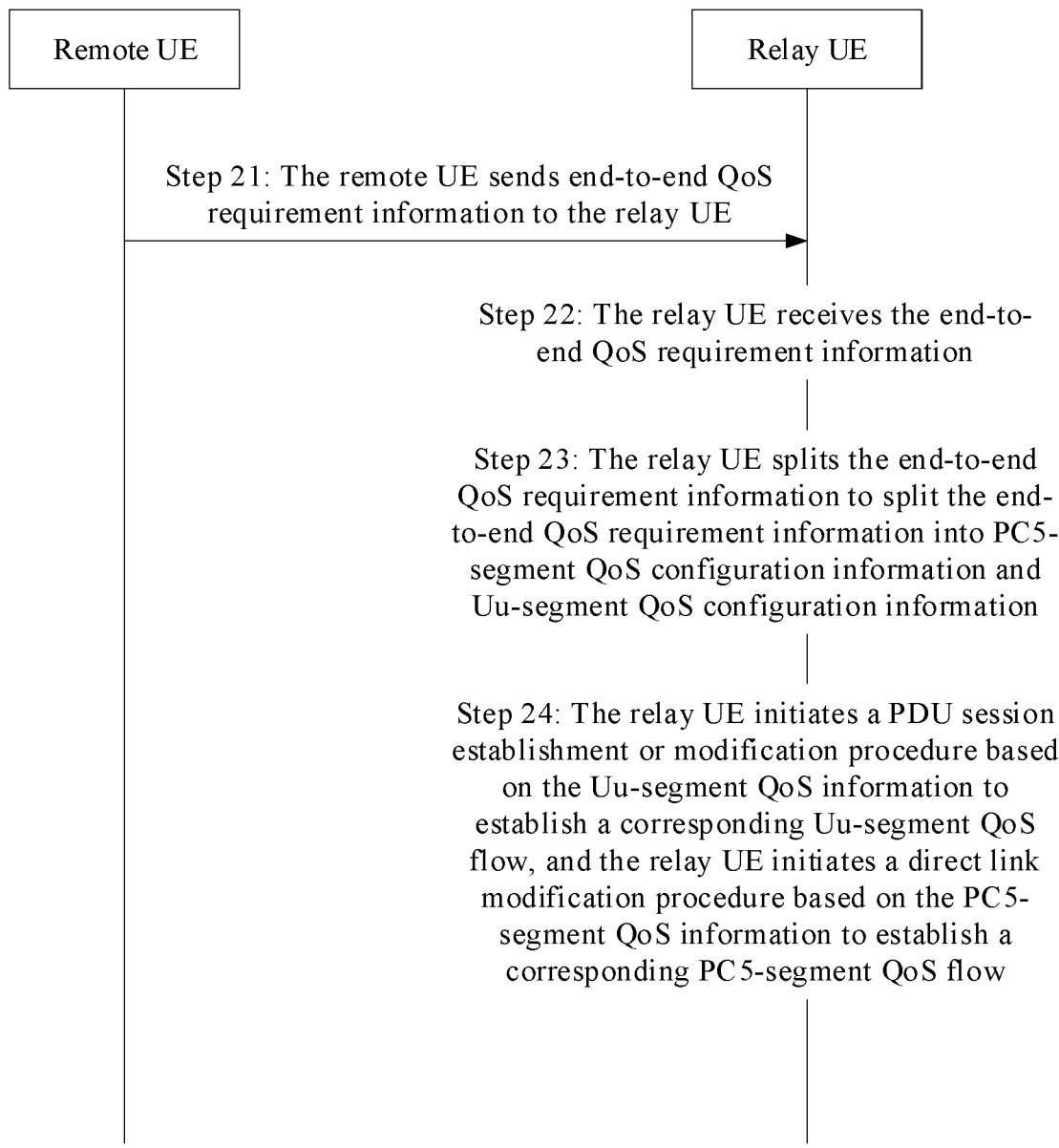
FIG. 5 is a fourth schematic flowchart of a method for splitting end-to-end QoS requirement information according to an embodiment of this disclosure.

Example 2: In a case of relay communication, it is assumed that the target device is the relay UE. As shown in FIG. 5, the technical solution to splitting end-to-end QoS requirement information by the relay UE includes the following steps.

Step 21: The remote UE sends the end-to-end QoS requirement information to the relay UE.

Step 22: The relay UE receives the end-to-end QoS requirement information.

Step 23: The relay UE splits the end-to-end QoS requirement information to split the end-to-end QoS requirement information into PC5-segment QoS configuration information (that is, the PC5-segment QoS information) and Uu-segment QoS configuration information (that is, the Uu-segment QoS information).

Step 24: Based on the Uu-segment QoS configuration information, the relay UE may establish a corresponding Uu-segment QoS flow in a PDU session modification procedure or a PDU session establishment procedure. After the establishment of the Uu-segment QoS flow is completed, the relay UE establishes a corresponding PC5-segment QoS flow in a direct link modification procedure based on the PC5-segment QoS configuration information obtained through splitting.

In this way, when the target device is the relay UE, the relay UE can complete the process of splitting the end-to-end QoS requirement information by itself, and the network side does not need to participate in the splitting, thereby reducing signaling overheads.

Optionally, in this embodiment of this disclosure, in step 201, the method for splitting end-to-end QoS requirement information according to this embodiment of this disclosure may include the following step 204.

Step 204: The target UE splits the end-to-end QoS requirement information into the PC5-segment QoS information and the Uu-segment QoS information based on a first mapping relationship or first information.

For example, the first mapping relationship includes a mapping relationship between the end-to-end QoS requirement information and the PC5-segment QoS information and Uu-segment QoS information.

Optionally, in this embodiment of this disclosure, the first mapping relationship is configured by the network side or preconfigured.

For example, the mapping relationship may map the end-to-end QoS requirement information to the PC5 segment and the Uu segment to obtain the PC5-segment QoS information and the Uu-segment QoS information.

In an example, the first mapping relationship may be shown in the following table.

| Parameter and attribute corresponding to the end-to-end QoS requirement information | Parameter and attribute corresponding to the PC5-segment QoS information | Parameter and attribute corresponding to the Uu-segment QoS information |
| --- | --- | --- |
| End-to-end QoS info | PC5-segment QoS info | Uu-segment QoS info |
| End-to-end QoS identifier | PC5-segment PQI | Uu-segment 5QI |
| End-to-end PDB | PC5-segment PDB | Uu-segment PDB |
| End-to-end GFBR | PC5-segment GFBR | Uu-segment GFBR |
| End-to-end MFBR | PC5-segment MFBR | PC5-segment MFBR |
| End-to-end PDB | PC5-segment PDB | Uu-segment PDB |
| End-to-end PER | PC5-segment PER | Uu-segment PER |

It should be noted that the end-to-end QoS identifier may be a 5QI in direct communication.

Example 2: In the process of splitting the end-to-end QoS requirement information, the remote UE or the relay UE can correspondingly find the PC5-segment QoS information and the Uu-segment QoS information based on a specific parameter category in the end-to-end QoS requirement information and based on the first mapping relationship table. For example, when the remote UE splits the end-to-end QoS requirement information, a specific parameter that needs to be split is the end-to-end PDB. In this case, the end-to-end PDB can be used as an index in the first mapping relationship table to correspondingly find the PC5-segment PDB and Uu-segment PDB.

For example, the first information includes QoS information that can be supported by a PC5 interface and QoS information of a Uu interface, which are detected by the target UE based on radio resource utilization or air interface link quality.

For example, the target device can perform end-to-end QoS requirement information splitting based on the first information (for example, if the supported PDB detected in the PC5 segment is 20 ms, and the PDB in the Uu segment is 80 ms, the end-to-end QoS requirement can be split based on the supported parameter (100 ms)).

In this way, the remote UE or the relay UE can complete the splitting of the end-to-end QoS requirement information based on the first mapping relationship or the first information.

Figure 6:
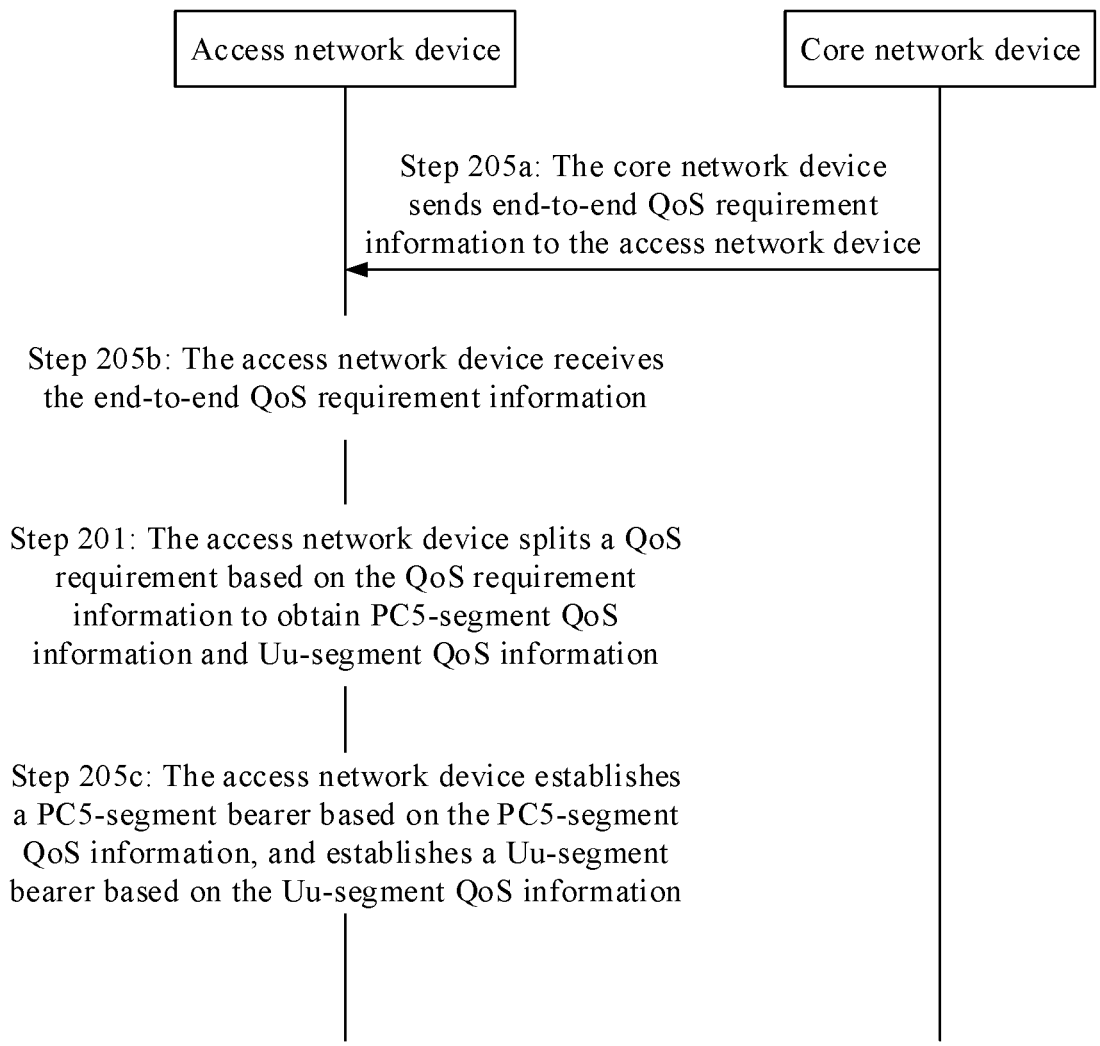
FIG. 6 is a fifth schematic flowchart of a method for splitting end-to-end QoS requirement information according to an embodiment of this disclosure.

FIG. 6 is a schematic flowchart of a method for splitting end-to-end QoS requirement information according to an embodiment of this disclosure. The method for splitting end-to-end QoS requirement information may include step 205a to step 205c.

For example, in a case that the target device is the access network device, before step 201, the method for splitting end-to-end QoS requirement information according to this embodiment of this disclosure may further include the following step 205a and step 205b.

Step 205a: A core network device sends the end-to-end QoS requirement information to the access network device.

Step 205b: The access network device receives the end-to-end QoS requirement information.

Based on step 205a, after step 201, the method for splitting end-to-end QoS requirement information according to this embodiment of this disclosure may further include the following step 205c.

Step 205c: The access network device establishes a PC5-segment bearer based on the PC5-segment QoS information, and establishes a Uu-segment bearer based on the Uu-segment QoS information.

For example, a target core network device may be any device in the core network device, for example, an SMF.

In an example, the target core network device may send the end-to-end QoS requirement information to the access network device in a PDU session establishment or modification procedure.

For example, the end-to-end QoS requirement information sent by the core network device to the access network device includes an end-to-end QoS requirement text.

In this way, when the target device is the access network device, an access network device can complete the process of splitting the end-to-end QoS requirement information by itself, thereby simplifying interaction between the access network and the core network, and reducing a signaling process.

Optionally, in this embodiment of this disclosure, in a case that the target device is the access network device, in step 201, the method for splitting end-to-end QoS requirement information according to this embodiment of this disclosure may include the following step 206.

Step 206: The access network device splits the end-to-end QoS requirement information into the PC5-segment QoS information and the Uu-segment QoS information based on a second mapping relationship or second information.

For example, the second mapping relationship includes a mapping relationship between the end-to-end QoS requirement information and the PC5-segment QoS information and Uu-segment QoS information; and the second information includes a QoS parameter of a PC5 interface and a QoS parameter of a Uu interface that are detected by the access network device.

Optionally, in this embodiment of this disclosure, the second mapping relationship is configured by the network side or preconfigured.

It should be noted that, because the access network device is a network-side device, the second mapping relationship obtained by the access network device may not be completely the same as the first mapping relationship obtained by the UE. Similarly, the second information obtained by the access network device and the first information obtained by the UE may not be completely the same or may be different.

It may be understood that when the access network device splits the end-to-end QoS requirement information based on the second mapping relationship or the second information, the splitting manner is similar to the splitting manners in the foregoing examples 2 and 3. Details are not described herein again.

Figure 7:
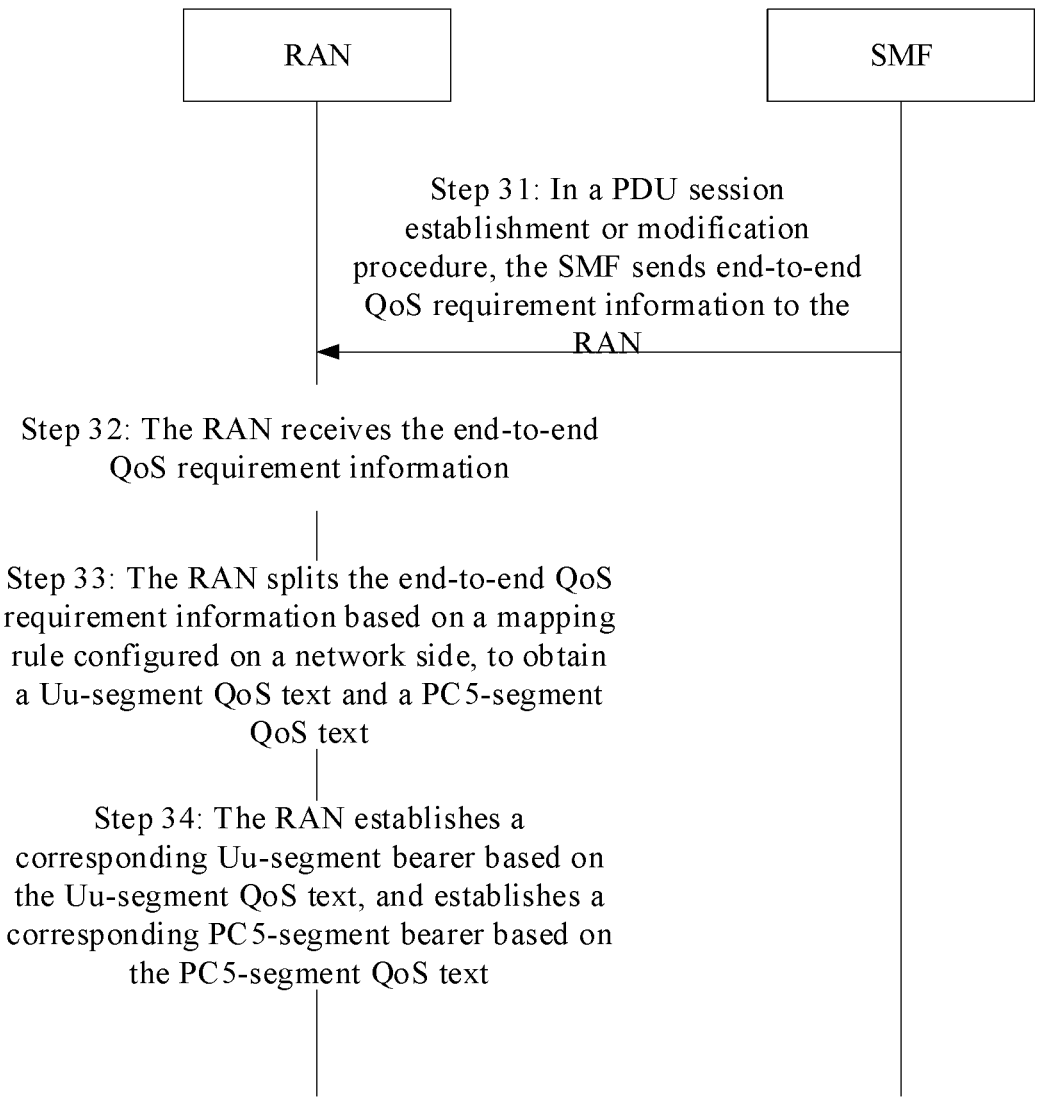
FIG. 7 is a sixth schematic flowchart of a method for splitting end-to-end QoS requirement information according to an embodiment of this disclosure.

Example 3: In a case of relay communication, it is assumed that the target device is the access network device RAN. As shown in FIG. 7, the technical solution to splitting end-to-end QoS requirement information by the access network device RAN includes the following steps.

Step 31: In a PDU session establishment or modification procedure, the SMF (that is, the core network device) sends the end-to-end QoS requirement information to the RAN.

Step 32: The RAN receives the end-to-end QoS requirement information.

Step 33: The RAN splits the end-to-end QoS requirement information based on a mapping rule (that is, the second mapping rule) configured on the network side, to obtain a Uu-segment QoS text (that is, the Uu-segment QoS information) and a PC5-segment QoS text (that is, the Uu-segment QoS information).

Step 34: The RAN establishes a corresponding Uu-segment bearer based on the Uu-segment QoS text, and establishes a corresponding PC5-segment bearer based on the PC5-segment QoS text.

In this way, the access network device can complete the splitting of the end-to-end QoS requirement information based on the second mapping relationship or the second information.

A method for splitting end-to-end QoS requirement information according to an embodiment of this disclosure may include the following steps 301 to 303.

Step 301: A target core network device splits end-to-end QoS requirement information to obtain PC5-segment QoS information and Uu-segment QoS information.

For example, the target core network device may be any device in a core network device, for example, an SMF or a PCF.

Before step 301, the method for splitting end-to-end QoS requirement information according to this embodiment of this disclosure may further include the following step 302.

Step 302: The target core network device receives the end-to-end QoS requirement information from relay UE.

In this embodiment of this disclosure, the end-to-end QoS requirement information is sent by remote UE to the relay UE.

Alternatively, after step 301, the method for splitting end-to-end QoS requirement information according to this embodiment of this disclosure may further include the following step 303.

Step 303: The target core network device sends the PC5-segment QoS information and the Uu-segment QoS information to an access network device.

In this embodiment of this disclosure, the PC5-segment QoS information includes a PC5-segment QoS parameter and a PC5-segment QoS attribute, the PC5-segment QoS parameter includes a PQI, and the PC5-segment QoS attribute includes a PDB; and the Uu-segment QoS information includes a Uu-segment QoS parameter and a Uu-segment QoS attribute, the Uu-segment QoS parameter includes a 5QI, and the Uu-segment QoS attribute includes a PDB.

In this embodiment of this disclosure, for the description of the PC5-segment QoS information, Uu-segment QoS information, PC5-segment QoS parameter, PC5-segment QoS attribute, Uu-segment QoS parameter, and Uu-segment QoS attribute, refer to the foregoing description. Details are not described herein again.

In this embodiment of this disclosure, for a relationship between the PC5-segment QoS information and the PC5-segment QoS parameter and the PC5-segment QoS attribute, also refer to the foregoing description. Details are not described herein again. Similarly, for a relationship between the Uu-segment QoS information and the Uu-segment QoS parameter and the Uu-segment QoS attribute, refer to the foregoing description. Details are not described herein again.

In this embodiment of this disclosure, for the description of the PQI, PDB, and 5QI, refer to the foregoing description. Details are not described herein again.

In the method for splitting end-to-end QoS requirement information according to this disclosure, the target core network device may split the end-to-end QoS requirement information into the PC5-segment QoS information and the Uu-segment QoS information based on the end-to-end QoS requirement information provided by the relay UE, and may send the split PC5-segment QoS information and Uu-segment QoS information to the access network, so that the split PC5-segment QoS information and Uu-segment QoS information are used on a communications link. In this way, splitting manners used when the target core network device splits the end-to-end QoS requirement information are diversified and enriched.

Optionally, in this embodiment of this disclosure, the target core network device includes a first core network device and a second core network device; and in step 301, the method for splitting end-to-end QoS requirement information according to this embodiment of this disclosure may include the following step 304 and step 305.

Step 304: The first core network device splits the end-to-end QoS requirement information to obtain the PC5-segment QoS information and a first rule.

Step 305: The first core network device sends the PC5-segment QoS information and the first rule to the second core network device.

For example, the first rule is used by the second core network device to generate the Uu-segment QoS information.

In an example, the first rule may be a PCC rule.

It may be understood that the first rule may be used by the second core network device to generate Uu-segment QoS configuration information (such as a QoS rule sent to UE, a QoS text sent to the RAN, and a PDR (Packet Detection Rule) sent to a UPF). Therefore, the Uu-segment QoS information can be determined.

For example, the first core network device may be a PCF in the core network device.

For example, the second core network device may be an SMF in the core network device.

For example, for the PC5-segment QoS information and the Uu-segment QoS information, refer to the foregoing description. Details are not described herein again.

Optionally, in this embodiment of this disclosure, in step 304, the method for splitting end-to-end QoS requirement information according to this embodiment of this disclosure may include the following step 306.

Step 306: The first core network device splits the end-to-end QoS requirement information based on target information to obtain the PC5-segment QoS information and the first rule.

For example, the target information includes at least one of the following: subscription information of the remote UE, subscription information of the relay UE, a payment policy, relay communication policy information authorized by the remote UE, and relay communication policy information authorized by the relay UE.

For example, the target information is used to define split policy information.

In an example, the subscription information of the remote UE and the subscription information of the relay UE are used to determine whether the UE authorizes the relay communication.

In an example, the payment policy is used to determine PC5-segment charging information and Uu-segment charging information.

In this way, the first core network device can obtain, based on the target information, the PC5-segment QoS information and the first rule complying with the end-to-end QoS requirement information, so that the Uu-segment QoS information complying with the end-to-end QoS requirement information is obtained subsequently.

Figure 8:
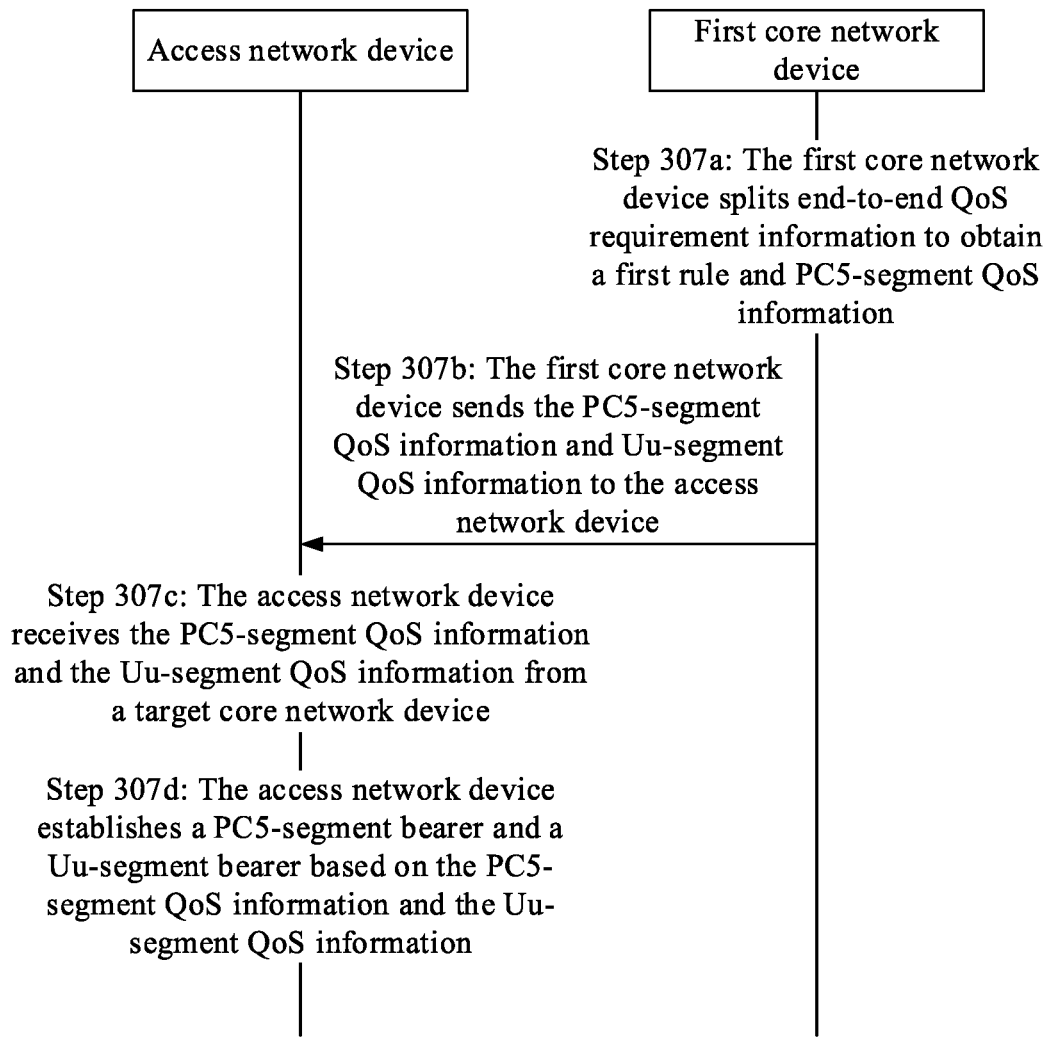
FIG. 8 is a seventh schematic flowchart of a method for splitting end-to-end QoS requirement information according to an embodiment of this disclosure.

FIG. 8 is a schematic flowchart of a method for splitting end-to-end QoS requirement information according to an embodiment of this disclosure. The method for splitting end-to-end QoS requirement information may include step 307a to step 307d.

For example, in a case that the target core network device includes the first core network device, in step 301, the method for splitting end-to-end QoS requirement information according to this embodiment of this disclosure may include the following step 307a.

Step 307a: The first core network device splits the end-to-end QoS requirement information to obtain the first rule and the PC5-segment QoS information.

After step 301, the method for splitting end-to-end QoS requirement information according to this embodiment of this disclosure may include the following step 307b.

Step 307b: The first core network device sends the PC5-segment QoS information and the Uu-segment QoS information to the access network device.

Step 307c: The access network device receives the PC5-segment QoS information and the Uu-segment QoS information from the target core network device.

Step 307d: The access network device establishes a PC5-segment bearer and a Uu-segment bearer based on the PC5-segment QoS information and the Uu-segment QoS information.

For example, the access network device receives the PC5-segment QoS information and the Uu-segment QoS information from the target core network device, where the PC5-segment QoS information and the Uu-segment QoS information are obtained by splitting the end-to-end QoS requirement information.

For example, the solution corresponding to step 307 is applicable to splitting of end-to-end QoS requirement information in a layer-2 based (layer-2 relay) protocol architecture.

For example, the first core network device splits the end-to-end QoS requirement information in a PDU session establishment procedure or a direct link modification procedure to obtain the first rule and the PC5-segment QoS information.

In an example, the PDU session may be a PDU session initiated by a terminal-side device (for example, the remote UE), or may be a PDU session initiated by a network-side device (for example, an application server). This is not limited in this embodiment of this disclosure.

Figure 9:
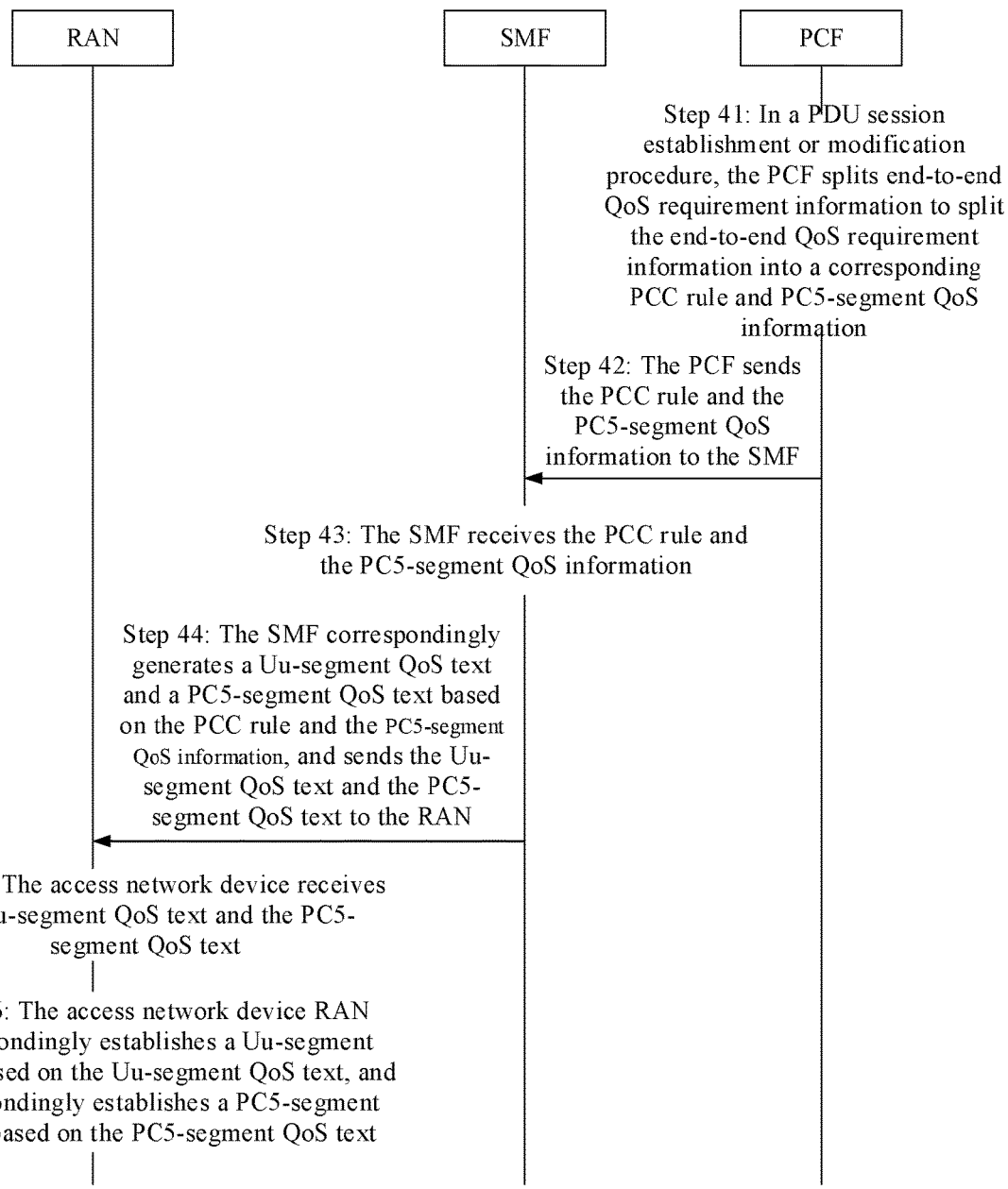
FIG. 9 is an eighth schematic flowchart of a method for splitting end-to-end QoS requirement information according to an embodiment of this disclosure.

Example 4: In a case of relay communication, it is assumed that the target core network device includes the PCF and that the communication protocol architecture is the layer-2 based (layer-2 relay) protocol architecture. As shown in FIG. 9, the technical solution to splitting end-to-end QoS requirement information by the PCF includes the following steps.

Step 41: In a PDU session establishment or modification procedure, the PCF may split the end-to-end QoS requirement information based on the end-to-end QoS requirement information, operator policy information, payment information, and the like to split the end-to-end QoS requirement information into a corresponding PCC rule (that is, the first rule) and the PC5-segment QoS information, where the PC5-segment QoS information includes a PC5-segment QoS parameter and a PC5-segment QoS attribute.

Step 42: The PCF sends the PCC rule and the PC5-segment QoS information to the SMF.

Step 43: The SMF receives the PCC rule and the PC5-segment QoS information.

Step 44: The SMF correspondingly generates a Uu-segment QoS text and a PC5-segment QoS text based on the PCC rule and the PC5-segment QoS information, and sends the Uu-segment QoS text and the PC5-segment QoS text to the RAN (that is, the access network device).

Step 45: The access network device receives the Uu-segment QoS text and the PC5-segment QoS text.

Step 46: The access network device RAN correspondingly establishes a Uu-segment bearer based on the Uu-segment QoS text, and correspondingly establishes a PC5-segment bearer based on the PC5-segment QoS text.

Figure 10:
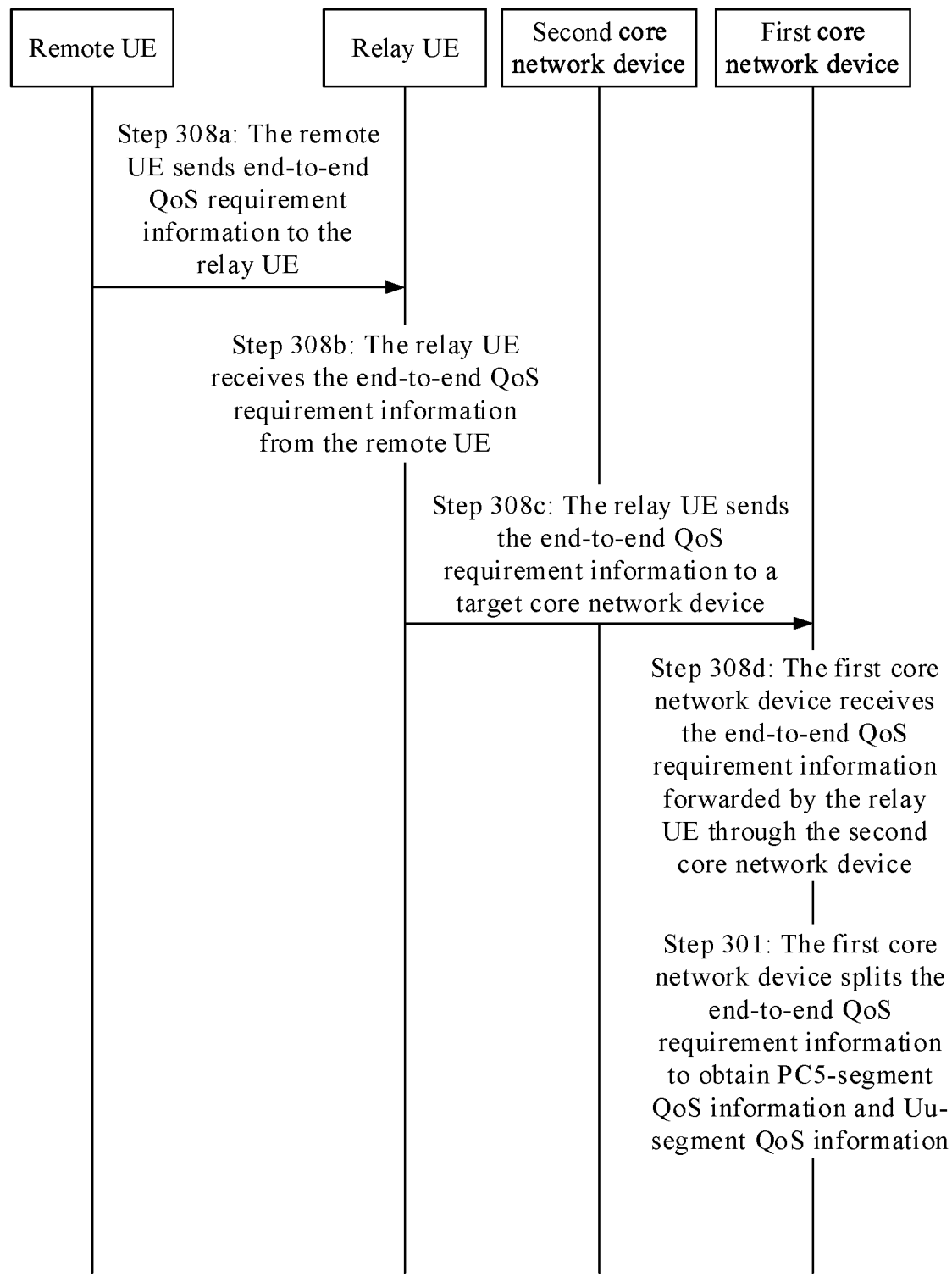
FIG. 10 is a ninth schematic flowchart of a method for splitting end-to-end QoS requirement information according to an embodiment of this disclosure.

FIG. 10 is a schematic flowchart of a method for splitting end-to-end QoS requirement information according to an embodiment of this disclosure. The method for splitting end-to-end QoS requirement information may include step 308a to step 308d.

For example, before step 301, the method for splitting end-to-end QoS requirement information according to this embodiment of this disclosure may include the following step 308a to step 308c.

Step 308a: The remote UE sends the end-to-end QoS requirement information to the relay UE.

Step 308b: The relay UE receives the end-to-end QoS requirement information from the remote UE.

Step 308c: The relay UE sends the end-to-end QoS requirement information to the target core network device.

Based on the foregoing steps 308a to 308c, in a case that the target core network device includes the first core network device, in step 302, the method for splitting end-to-end QoS requirement information according to this embodiment of this disclosure may include the following step 308d.

Step 308d: The first core network device receives the end-to-end QoS requirement information forwarded by the relay UE through the second core network device.

For example, the solution corresponding to step 309a and step 309b is applicable to splitting of end-to-end QoS requirement information in a layer-3 based (layer-3 relay) protocol architecture.

For example, step 308a to step 308d are applicable to splitting of end-to-end QoS requirement information in the layer-3 based protocol architecture.

For example, the end-to-end QoS requirement information is sent by the remote UE to the relay UE.

In this embodiment of this disclosure, the end-to-end QoS requirement information may be carried in a direct link modification request message (direct link modification request).

In this embodiment of this disclosure, the end-to-end QoS requirement information may be carried in a remote UE report message or other NAS information, and sent to the target core network device by using the remote UE report message.

In this embodiment of this disclosure, the end-to-end QoS requirement information indicates a parameter corresponding to the end-to-end QoS requirement information and an attribute corresponding to the end-to-end QoS requirement information in a case that the end-to-end QoS requirement is satisfied. Specifically, for the parameter corresponding to the end-to-end QoS requirement information and the attribute corresponding to the end-to-end QoS requirement information, refer to the foregoing description. Details are not described herein again.

In this embodiment of this disclosure, the target core network device may be any device in the core network, for example, the SMF.

In this embodiment of this disclosure, for the first core network device and the second core network device, refer to the foregoing description. Details are not described herein again.

Figure 11:
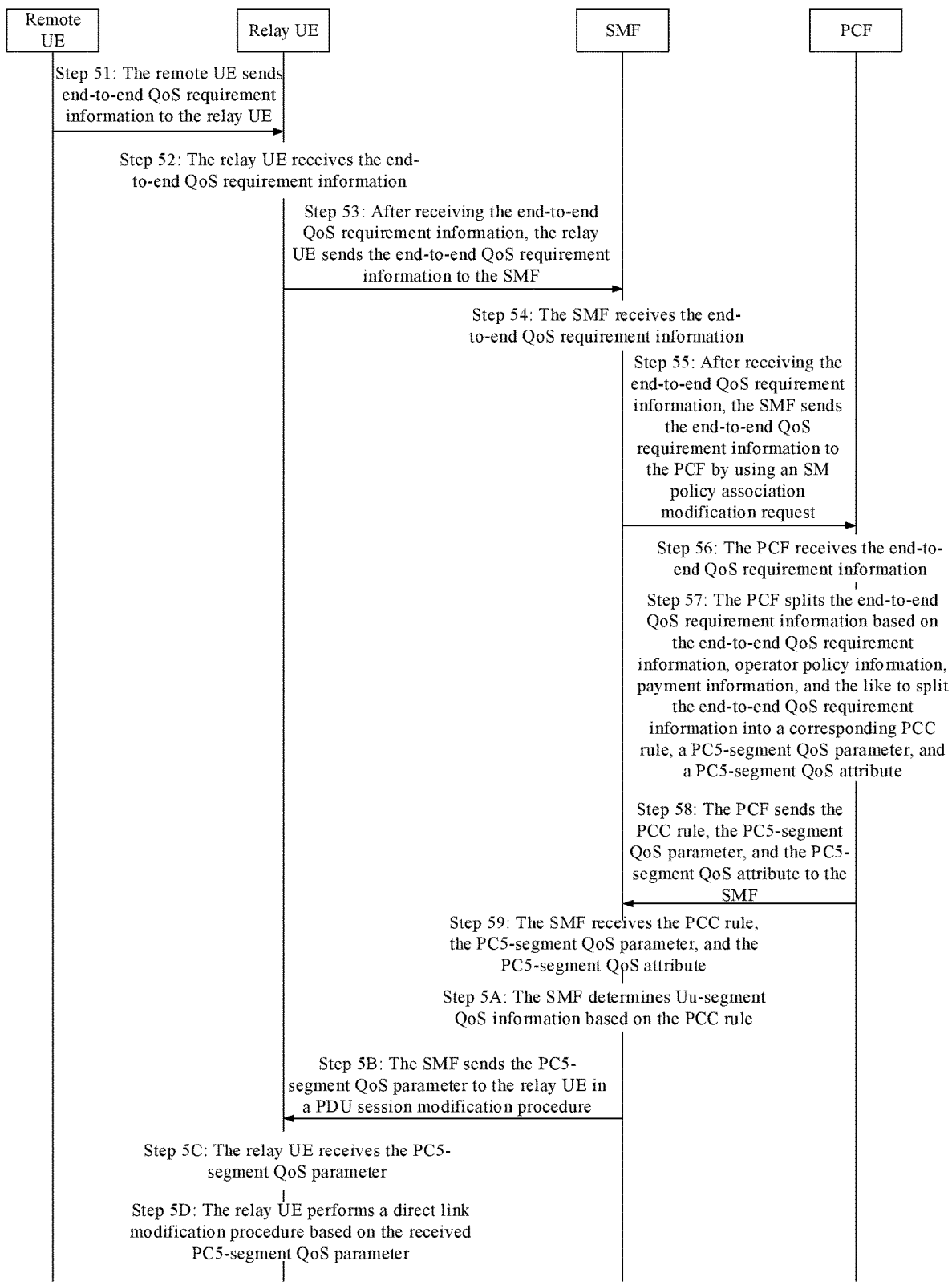
FIG. 11 is a tenth schematic flowchart of a method for splitting end-to-end QoS requirement information according to an embodiment of this disclosure.

Example 5: In a case that one relay UE is included between the remote UE and a UPF anchor point, it is assumed that the first core network device is the PCF and that the communication protocol architecture is the layer-2 based (layer-2 relay) protocol architecture. As shown in FIG. 11, the technical solution to splitting end-to-end QoS requirement information by the PCF includes the following steps.

Step 51: The remote UE sends the end-to-end QoS requirement information to the relay UE.

Step 52: The relay UE receives the end-to-end QoS requirement information.

Step 53: After receiving the end-to-end QoS requirement information, the relay UE sends the end-to-end QoS requirement information to the SMF (that is, the second core network device).

Step 54: The SMF receives the end-to-end QoS requirement information.

Step 55: After receiving the end-to-end QoS requirement information, the SMF sends the end-to-end QoS requirement information to the PCF by using an SM policy association modification request.

Step 56: The PCF receives the end-to-end QoS requirement information.

Step 57: The PCF splits the end-to-end QoS requirement information based on the end-to-end QoS requirement information, operator policy information, payment information, and the like to split the end-to-end QoS requirement information into a corresponding PCC rule (that is, the first rule), a PC5-segment QoS parameter (for example, PQI, GFBR, or MFBR), and a PC5 QoS attribute (for example, PDB, PER, or maximum data burst volume (MDBV)).

Step 58: The PCF sends the PCC rule, the PC5-segment QoS parameter, and the PC5 QoS attribute to the SMF.

Step 59: The SMF receives the PCC rule, the PC5-segment QoS parameter, and the PC5 QoS attribute.

Step 5A: The SMF determines the Uu-segment QoS information (for example, a Uu-segment QoS parameter, a Uu-segment QoS rule, and a Uu-segment QoS text) based on the PCC rule.

Step 5B: The SMF sends the PC5-segment QoS parameter to the relay UE and the RAN (that is, the access network device) in a PDU session modification procedure, or the SMF sends the PC5-segment QoS parameter to the relay UE in the PDU session modification procedure.

Step 5C: The relay UE receives the PC5-segment QoS parameter.

Step 5D: The relay UE performs a direct link modification procedure based on the received PC5-segment QoS parameter.

Optionally, in this embodiment of this disclosure, the target core network device includes the first core network device; and in step 308c, the method for splitting end-to-end QoS requirement information according to this embodiment of this disclosure may include the following step 308c0.

Step 308c0: The relay UE forwards the end-to-end QoS requirement information to the first core network device through the second core network device.

For example, for the first core network device and the second core network device, refer to the foregoing description. Details are not described herein again.

In an example, when the first core network device is the PCF and the second core network device is the SMF, the SMF may send the end-to-end QoS requirement information to the PCF by using a session management function policy association modification (SM policy association modification) request.

Figure 12:
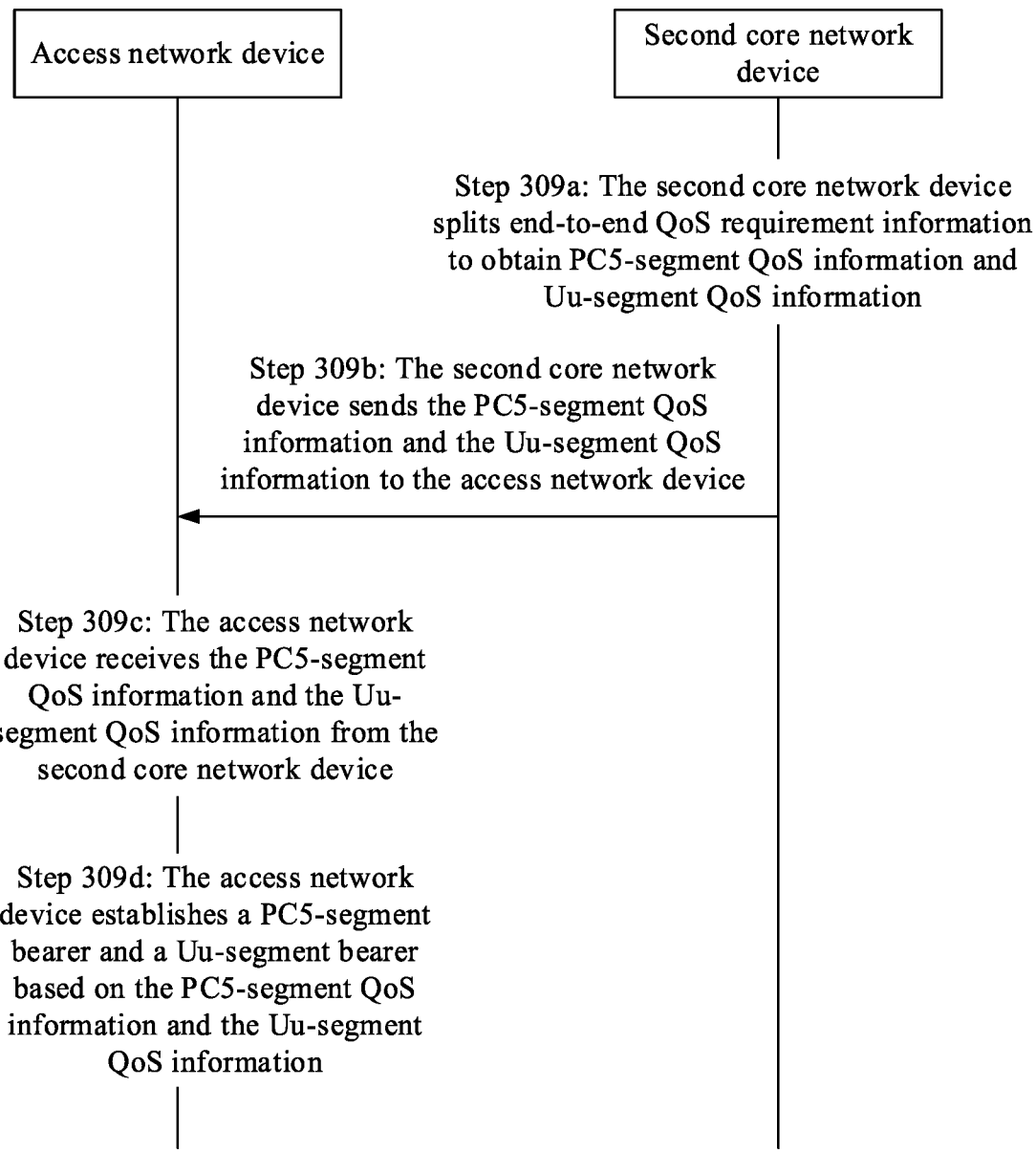
FIG. 12 is an eleventh schematic flowchart of a method for splitting end-to-end QoS requirement information according to an embodiment of this disclosure.

FIG. 12 is a schematic flowchart of a method for splitting end-to-end QoS requirement information according to an embodiment of this disclosure. The method for splitting end-to-end QoS requirement information may include step 309a to step 309d.

Optionally, in this embodiment of this disclosure, the target core network device includes the second core network device; and before step 303, in step 301, the method for splitting end-to-end QoS requirement information according to this embodiment of this disclosure may include the following step 309a.

Step 309a: The second core network device splits the end-to-end QoS requirement information to obtain the PC5-segment QoS information and the Uu-segment QoS information.

After step 301, the method for splitting end-to-end QoS requirement information according to this embodiment of this disclosure may include the following step 309b.

Step 309b: The second core network device sends the PC5-segment QoS information and the Uu-segment QoS information to the access network device.

Step 309c: The access network device receives the PC5-segment QoS information and the Uu-segment QoS information from the second core network device.

Step 309d: The access network device establishes a PC5-segment bearer and a Uu-segment bearer based on the PC5-segment QoS information and the Uu-segment QoS information.

For example, the access network device receives the PC5-segment QoS information and the Uu-segment QoS information from the target core network device, where the PC5-segment QoS information and the Uu-segment QoS information are obtained by splitting the end-to-end QoS requirement information.

For example, the solution corresponding to step 309a and step 309b is applicable to splitting of end-to-end QoS requirement information in a layer-2 based protocol architecture.

For example, for the second core network device, refer to the foregoing description. Details are not described herein again.

For example, for the PC5-segment QoS information and the Uu-segment QoS information, refer to the foregoing description. Details are not described herein again.

Optionally, in this embodiment of this disclosure, in step 309, the method for splitting end-to-end QoS requirement information according to this embodiment of this disclosure may include the following step 310.

Step 310: The second core network device splits the end-to-end QoS requirement information based on target information to obtain the PC5-segment QoS information and the Uu-segment QoS information.

For example, the target information includes at least one of the following: subscription information of the remote UE, subscription information of the relay UE, a payment policy, relay communication policy information authorized by the remote UE, and relay communication policy information authorized by the relay UE.

For example, for the subscription information, the payment policy, and the relay communication policy information, refer to the foregoing description. Details are not described herein again.

Figure 13:
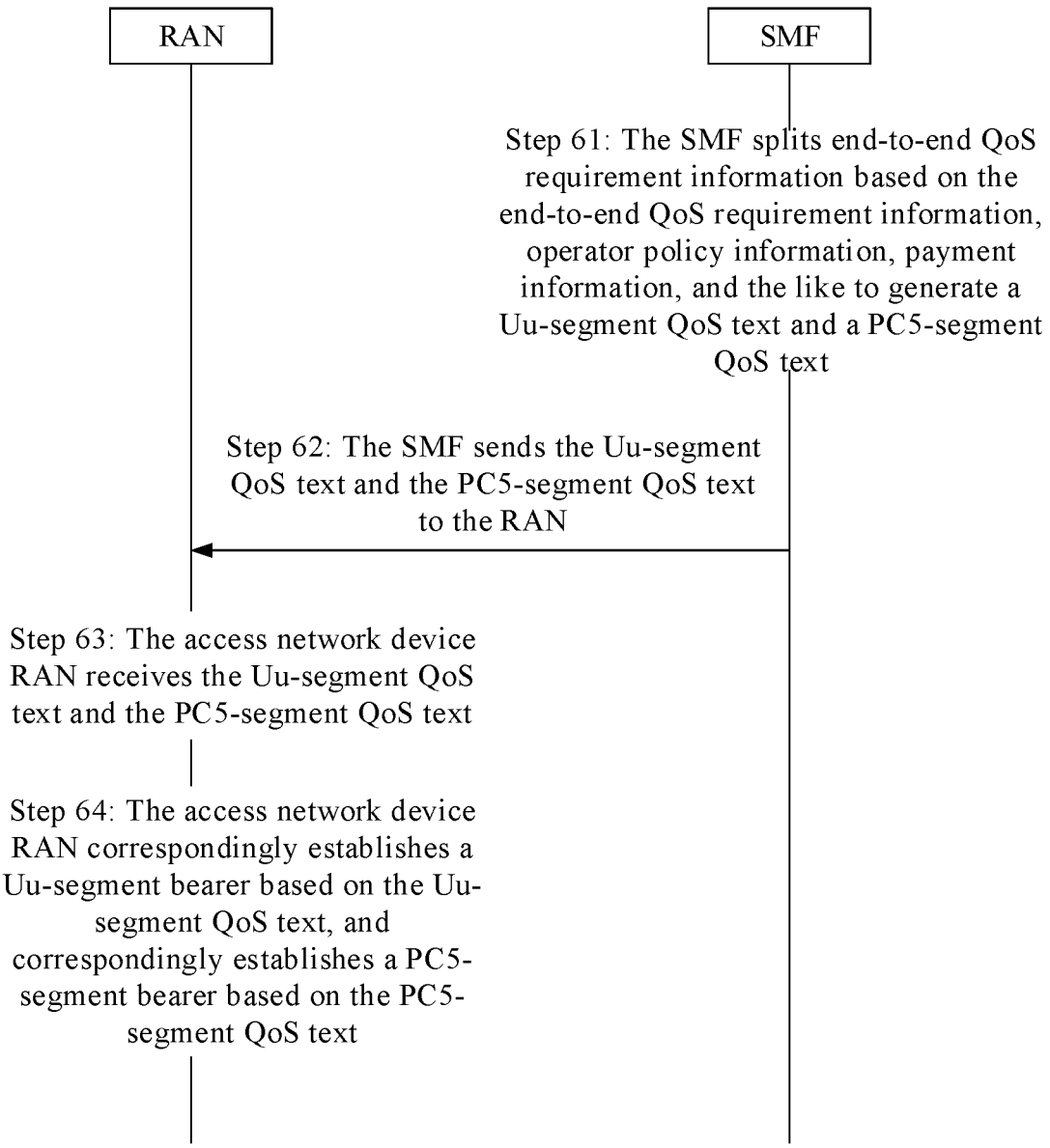
FIG. 13 is a twelfth schematic flowchart of a method for splitting end-to-end QoS requirement information according to an embodiment of this disclosure.

Example 6: In a case that one relay UE is included between the remote UE and a UPF anchor point, it is assumed that the second core network device is the SMF and that the communication protocol architecture is the layer-2 based protocol architecture. As shown in FIG. 13, the technical solution to splitting end-to-end QoS requirement information by the SMF includes the following steps.

Step 61: The SMF splits the end-to-end QoS requirement information based on the end-to-end QoS requirement information, operator policy information, payment information, and the like to generate a Uu-segment QoS text and a PC5-segment QoS text.

Step 62: The SMF sends the Uu-segment QoS text and the PC5-segment QoS text to the RAN (that is, the access network device).

Step 63: The access network device RAN receives the Uu-segment QoS text and the PC5-segment QoS text.

Step 64: The access network device RAN correspondingly establishes a Uu-segment bearer based on the Uu-segment QoS text, and correspondingly establishes a PC5-segment bearer based on the PC5-segment QoS text.

Optionally, in this embodiment of this disclosure, in step 303 of sending the PC5-segment QoS information and the Uu-segment QoS information to the access network device, the method for splitting end-to-end QoS requirement information according to this embodiment of this disclosure may include the following step 311.

Step 311: The target core network device sends the PC5-segment QoS information and the Uu-segment QoS information to the access network device in a PDU session establishment procedure and a direct link modification procedure.

Optionally, in this embodiment of this disclosure, the PC5-segment QoS information includes the PC5-segment QoS text, and the Uu-segment QoS information includes the Uu-segment QoS text.

For example, the Uu-segment QoS text may be used to reflect the Uu-segment QoS information, and correspondingly, the PC5-segment QoS text may be used to reflect the PC5-segment QoS information.

It should be noted that the method for splitting end-to-end QoS requirement information according to the embodiments of this disclosure may be performed by an apparatus for splitting end-to-end QoS requirement information, or a control module for performing the method for splitting end-to-end QoS requirement information in an apparatus for splitting end-to-end QoS requirement information. In the embodiments of this disclosure, an apparatus for splitting end-to-end QoS requirement information according to an embodiment of this disclosure is described by using an example in which the apparatus for splitting end-to-end QoS requirement information performs the method for splitting end-to-end QoS requirement information.

Figure 14:
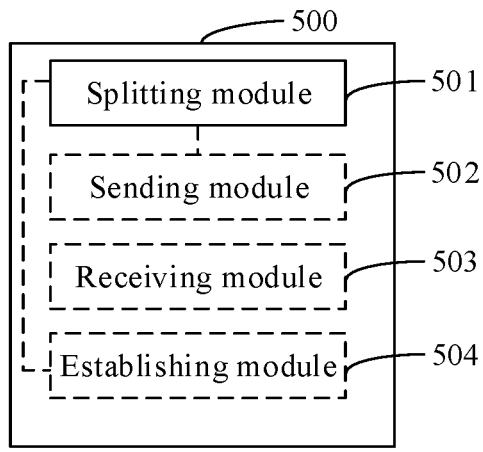
FIG. 14 is a first schematic diagram of a structure of an apparatus for splitting end-to-end QoS requirement information according to an embodiment of this disclosure.

FIG. 14 is a schematic diagram of a possible structure of an apparatus for splitting end-to-end QoS requirement information according to an embodiment of this disclosure. As shown in FIG. 14, an apparatus 500 for splitting end-to-end QoS requirement information includes a splitting module 501, where the splitting module 501 is configured to split end-to-end QoS requirement information into PC5-segment QoS information and Uu-segment QoS information, where a target device includes target UE and an access network device.

In this embodiment of this disclosure, the apparatus for splitting end-to-end QoS requirement information splits the end-to-end QoS requirement information into the PC5-segment QoS information and the Uu-segment QoS information. In this way, an entity that splits the end-to-end QoS requirement information is no longer limited to a network-side device, and further, splitting scenarios can be diversified and enriched. Therefore, it is convenient to split the end-to-end QoS requirement information in any scenario.

Optionally, in this embodiment of this disclosure, the PC5-segment QoS information and the Uu-segment QoS information satisfy the end-to-end QoS requirement information.

Optionally, in this embodiment of this disclosure, the PC5-segment QoS information includes a PC5-segment QoS parameter and a PC5-segment QoS attribute, the PC5-segment QoS parameter includes a PQI, and the PC5-segment QoS attribute includes a PDB; and the Uu-segment QoS information includes a Uu-segment QoS parameter and a Uu-segment QoS attribute, the Uu-segment QoS parameter includes a 5QI, and the Uu-segment QoS attribute includes a PDB.

Optionally, in this embodiment of this disclosure, in a case that the target UE is remote UE, the apparatus 500 for splitting end-to-end QoS requirement information may further include a sending module 502, where the sending module 502 is configured to send the Uu-segment QoS information and the PC5-segment QoS information that are split by the splitting module 501 to relay UE, where the Uu-segment QoS information is used by the relay UE to establish a corresponding Uu-segment QoS flow in a PDU session establishment or modification procedure; and the PC5-segment QoS information is used by the relay UE to establish a corresponding PC5-segment QoS flow in a direct link modification procedure.

Optionally, in this embodiment of this disclosure, in a case that the target UE is relay UE, the apparatus 500 for splitting end-to-end QoS requirement information may further include a receiving module 503 and an establishing module 504, where the receiving module 503 is configured to receive the end-to-end QoS requirement information from remote UE; and the establishing module is configured to initiate a PDU session establishment or modification procedure based on the Uu-segment QoS information split by the splitting module 501 to establish a corresponding Uu-segment QoS flow, and initiate a direct link modification procedure based on the PC5-segment QoS information to establish a corresponding PC5-segment QoS flow.

Optionally, in this embodiment of this disclosure, the splitting module is specifically configured to split the end-to-end QoS requirement information into the PC5-segment QoS information and the Uu-segment QoS information based on a first mapping relationship or first information, where the first mapping relationship includes a mapping relationship between the end-to-end QoS requirement information and the PC5-segment QoS information and Uu-segment QoS information; and the first information includes a QoS parameter of a PC5 interface and a QoS parameter of a Uu interface that are detected by the target UE.

Optionally, in this embodiment of this disclosure, the first mapping relationship is configured by a network side or preconfigured.

Optionally, in this embodiment of this disclosure, in a case that the target device is the access network device, the apparatus 500 for splitting end-to-end QoS requirement information may further include an establishing module 504, where the establishing module is configured to establish a PC5-segment bearer based on the PC5-segment QoS information split by the splitting module 501 and establish a Uu-segment bearer based on the Uu-segment QoS information.

Optionally, in this embodiment of this disclosure, in a case that the target device is the access network device, the splitting module 501 is specifically configured to split the end-to-end QoS requirement information into the PC5-segment QoS information and the Uu-segment QoS information based on a second mapping relationship or second information, where the second mapping relationship includes a mapping relationship between the end-to-end QoS requirement information and the PC5-segment QoS information and Uu-segment QoS information; and the second information includes a QoS parameter of a PC5 interface and a QoS parameter of a Uu interface that are detected by the access network device.

Optionally, in this embodiment of this disclosure, the second mapping relationship is configured by a network side or preconfigured.

Figure 15:
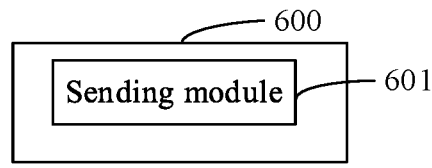
FIG. 15 is a second schematic diagram of a structure of an apparatus for splitting end-to-end QoS requirement information according to an embodiment of this disclosure.

FIG. 15 is a schematic diagram of a possible structure of an apparatus for splitting end-to-end QoS requirement information according to an embodiment of this disclosure. As shown in FIG. 15, an apparatus 600 for splitting end-to-end QoS requirement information includes a sending module 601, where the sending module 601 is configured to send end-to-end QoS requirement information to an access network device, where the end-to-end QoS requirement information includes an end-to-end QoS requirement text.

Figure 16:
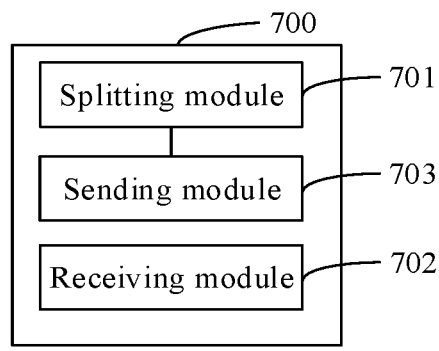
FIG. 16 is a third schematic diagram of a structure of an apparatus for splitting end-to-end QoS requirement information according to an embodiment of this disclosure.

FIG. 16 is a schematic diagram of a possible structure of an apparatus for splitting end-to-end QoS requirement information according to an embodiment of this disclosure. As shown in FIG. 16, an apparatus 700 for splitting end-to-end QoS requirement information includes a splitting module 701, a receiving module 702, and a sending module 703, where the splitting module 701 is configured to split end-to-end QoS requirement information to obtain PC5-segment QoS information and Uu-segment QoS information; and the receiving module 702 is configured to receive the end-to-end QoS requirement information from relay UE, where the end-to-end QoS requirement information is sent by remote UE to the relay UE; or the sending module 703 is configured to send the PC5-segment QoS information and the Uu-segment QoS information that are split by the splitting module 701 to an access network device, where the PC5-segment QoS information includes a PC5-segment QoS parameter and a PC5-segment QoS attribute, the PC5-segment QoS parameter includes a PQI, and the PC5-segment QoS attribute includes a PDB; and the Uu-segment QoS information includes a Uu-segment QoS parameter and a Uu-segment QoS attribute, the Uu-segment QoS parameter includes a 5QI, and the Uu-segment QoS attribute includes a PDB.

Optionally, in this embodiment of this disclosure, the target core network device includes a first core network device and a second core network device, and the splitting module 701 is specifically configured to split the end-to-end QoS requirement information to obtain the PC5-segment QoS information and a first rule; and the sending module 703 is further configured to send the PC5-segment QoS information and the first rule that are split by the splitting module 701 to the second core network device, where the first rule is used by the second core network device to generate the Uu-segment QoS information.

Optionally, in this embodiment of this disclosure, the splitting module 701 is specifically configured to split the end-to-end QoS requirement information based on target information to obtain the PC5-segment QoS information and the first rule, where the target information includes at least one of the following: subscription information of the remote UE, subscription information of the relay UE, a payment policy, relay communication policy information authorized by the remote UE, and relay communication policy information authorized by the relay UE.

Optionally, in this embodiment of this disclosure, in a case that the target core network device includes a first core network device, the splitting module 701 is specifically configured to split the end-to-end QoS requirement information to obtain a first rule and the PC5-segment QoS information.

Optionally, in this embodiment of this disclosure, in a case that the target core network device includes a first core network device, the receiving module 702 is specifically configured to receive the end-to-end QoS requirement information forwarded by the relay UE through a second core network device, where the end-to-end QoS requirement information is sent by the remote UE to the relay UE.

Optionally, in this embodiment of this disclosure, the target core network device includes a second core network device, and the splitting module 701 is specifically configured to split the end-to-end QoS requirement information to obtain the PC5-segment QoS information and the Uu-segment QoS information.

Optionally, in this embodiment of this disclosure, the splitting module 701 is specifically configured to split the end-to-end QoS requirement information based on target information to obtain the PC5-segment QoS information and the Uu-segment QoS information, where the target information includes at least one of the following: subscription information of the remote UE, subscription information of the relay UE, a payment policy, relay communication policy information authorized by the remote UE, and relay communication policy information authorized by the relay UE.

Optionally, in this embodiment of this disclosure, the sending module 703 is specifically configured to send the PC5-segment QoS information and the Uu-segment QoS information to the access network device in a PDU session establishment procedure and a direct link modification procedure.

Optionally, in this embodiment of this disclosure, the PC5-segment QoS information includes a PC5-segment QoS text, and the Uu-segment QoS information includes a Uu-segment QoS text.

Figure 17:
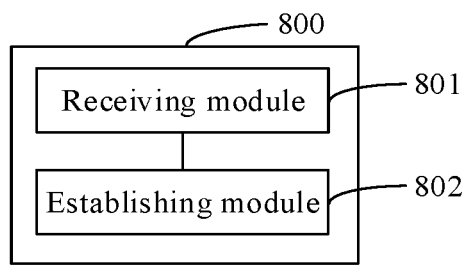
FIG. 17 is a fourth schematic diagram of a structure of an apparatus for splitting end-to-end QoS requirement information according to an embodiment of this disclosure.

FIG. 17 is a schematic diagram of a possible structure of an apparatus for splitting end-to-end QoS requirement information according to an embodiment of this disclosure. As shown in FIG. 17, an apparatus 800 for splitting end-to-end QoS requirement information includes a receiving module 801 and an establishing module 802, where the receiving module 801 is configured to receive PC5-segment QoS information and Uu-segment QoS information from a target core network device, where the PC5-segment QoS information and the Uu-segment QoS information are obtained by splitting end-to-end QoS requirement information; and the establishing module 802 is configured to establish a PC5-segment bearer and a Uu-segment bearer based on the PC5-segment QoS information and the Uu-segment QoS information.

Figure 18:
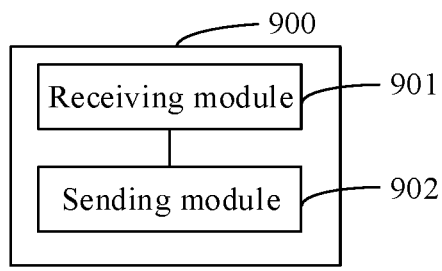
FIG. 18 is a fifth schematic diagram of a structure of an apparatus for splitting end-to-end QoS requirement information according to an embodiment of this disclosure.

FIG. 18 is a schematic diagram of a possible structure of an apparatus for splitting end-to-end QoS requirement information according to an embodiment of this disclosure. As shown in FIG. 18, an apparatus 900 for splitting end-to-end QoS requirement information includes a receiving module 901 and a sending module 902, where the receiving module 901 is configured to receive end-to-end QoS requirement information from remote UE; and the sending module 902 is configured to send the end-to-end QoS requirement information received by the receiving module 901 to a target core network device.

Optionally, in this embodiment of this disclosure, the target core network device includes a first core network device; and the sending module 902 is specifically configured to forward the end-to-end QoS requirement information to the first core network device through a second core network device.

The apparatus for splitting end-to-end QoS requirement information in this embodiment of this disclosure may be a terminal, or may be a component, an integrated circuit, or a chip in a terminal. The apparatus may be a mobile terminal, or may be a nonmobile terminal. For example, the mobile terminal may include but is not limited to the foregoing illustrated type of the terminal 11. The nonmobile terminal may be a server, a network attached storage (NAS), a personal computer (PC), a television (TV), a teller machine, a self-service machine, or the like. This is not specifically limited in this embodiment of this disclosure.

The apparatus for splitting end-to-end QoS requirement information in this embodiment of this disclosure may be an apparatus having an operating system. The operating system may be an Android operating system, an iOS operating system, or other possible operating systems, and is not specifically limited in this embodiment of this disclosure.

The apparatus for splitting end-to-end QoS requirement information according to this embodiment of this disclosure can implement each process implemented in the method embodiments in FIG. 2 to FIG. 13, with the same technical effect achieved. To avoid repetition, details are not described herein again.

Figure 19:
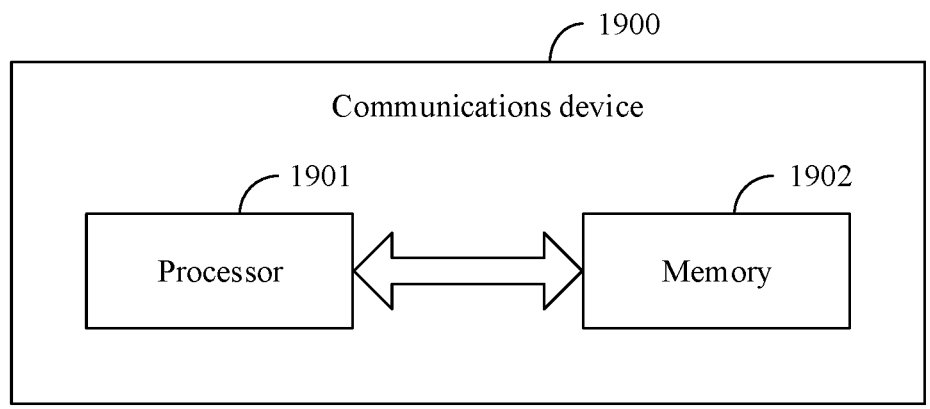
FIG. 19 is a schematic diagram of a communications device according to an embodiment of this disclosure.

Optionally, as shown in FIG. 19, an embodiment of this disclosure further provides a communications device 1900, including a processor 1901, a memory 1902, and a program or instructions stored in the memory 1902 and capable of running on the processor 1901. For example, when the communications device 1900 is a terminal, and the program or instructions are executed by the processor 1901, each process of the foregoing method embodiment for splitting end-to-end QoS requirement information is implemented, with the same technical effect achieved. When the communications device 1900 is a network-side device, and the program or instructions are executed by the processor 1901, each process of the foregoing method embodiment for splitting end-to-end QoS requirement information is implemented, with the same technical effect achieved. To avoid repetition, details are not described herein again.

Figure 20:
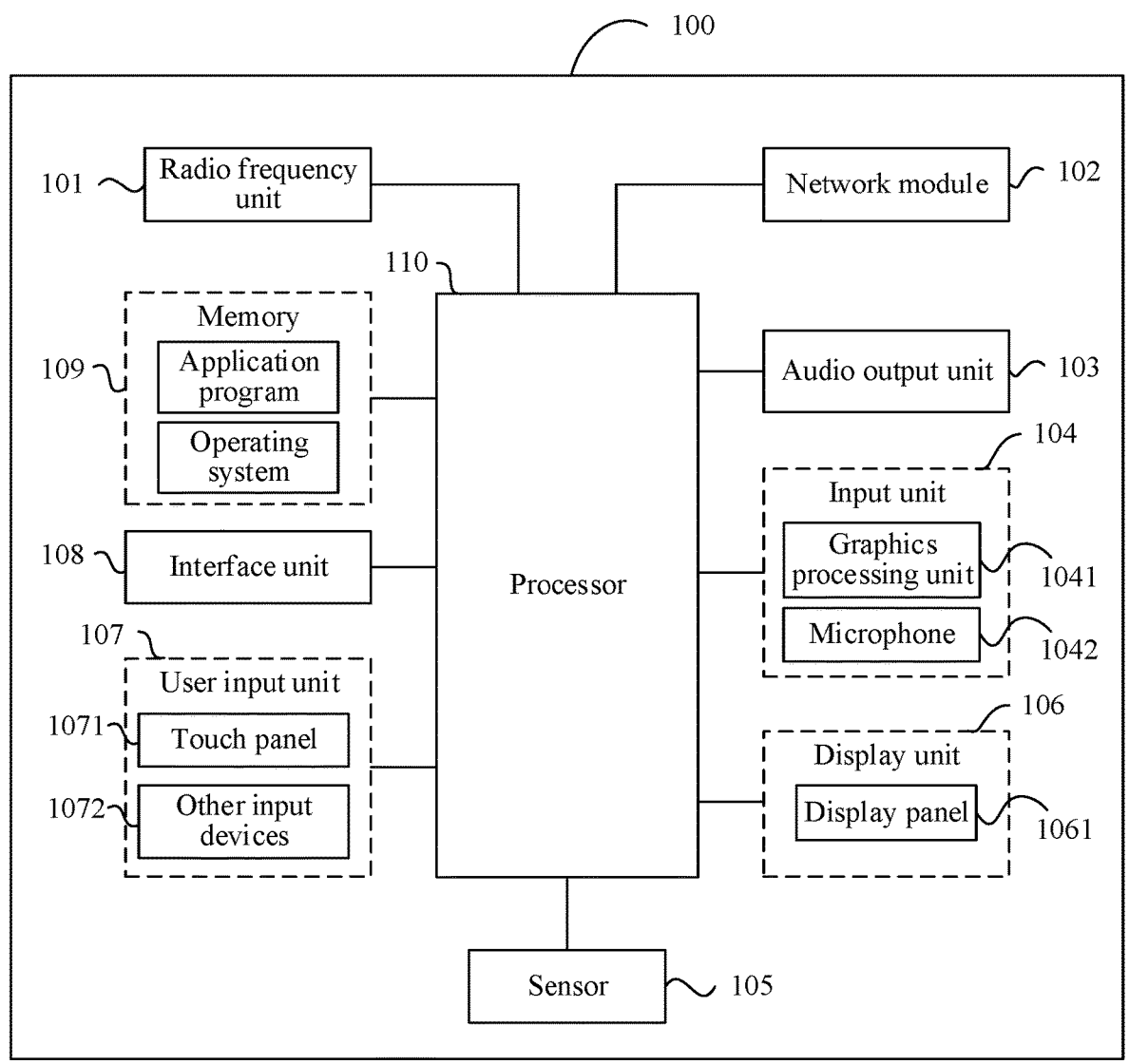
FIG. 20 is a schematic diagram of a hardware structure of a terminal according to an embodiment of this disclosure.

FIG. 20 is a schematic diagram of a hardware structure of a terminal for implementing an embodiment of this disclosure.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art may understand that the terminal 100 may further include a power supply (for example, a battery) supplying power to all components. The power supply may be logically connected to the processor 110 through a power management system. In this way, functions such as charge management, discharge management, and power consumption management are implemented by using the power management system. The terminal structure shown in FIG. 20 does not constitute a limitation on the terminal. The terminal may include more or fewer components than those shown in the figure, or some components are combined, or component arrangements are different. Details are not described herein again.

It should be understood that, in this embodiment of this disclosure, the input unit 104 may include a graphics processing unit (GPU) 1041 and a microphone 1042. The graphics processing unit 1041 processes image data of a still picture or video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and other input devices 1072. The touch panel 1071 is also referred to as a touchscreen. The touch panel 1071 may include two parts: a touch detection apparatus and a touch controller. The other input devices 1072 may include but are not limited to a physical keyboard, a function key (such as a volume control key or a switch key), a trackball, a mouse, and a joystick. Details are not described herein again.

In this embodiment of this disclosure, after receiving downlink data from a network-side device, the radio frequency unit 101 sends the downlink data to the processor 110 for processing, and in addition, sends uplink data to the network-side device. Generally, the radio frequency unit 101 includes but is not limited to an antenna, at least one amplifier, a transceiver, a coupler, a low noise amplifier, a duplexer, and the like.

The memory 109 may be configured to store software programs or instructions and various data. The memory 109 may primarily include a program or instruction storage area and a data storage area. The program or instruction storage area may store an operating system, application programs or instructions (such as an audio play function and an image play function) required by at least one function, and the like. In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-volatile solid-state storage device.

The processor 110 may include one or more processing units. Optionally, the processor 110 may integrate an application processor and a modem processor. The application processor mainly processes the operating system, a user interface, an application program or instructions, and the like. The modem processor mainly processes wireless communication. For example, the modem processor is a baseband processor. It may be understood that the modem processor may alternatively be not integrated in the processor 110.

When the terminal 100 is a target device, the processor 110 is configured to split end-to-end QoS requirement information into PC5-segment QoS information and Uu-segment QoS information, where the target device includes target UE and an access network device.

In this embodiment of this disclosure, the target device splits the end-to-end QoS requirement information into the PC5-segment QoS information and the Uu-segment QoS information. In this way, an entity that splits the end-to-end QoS requirement information is no longer limited to the network-side device, and further, splitting scenarios can be diversified and enriched. Therefore, it is convenient to split the end-to-end QoS requirement information in any scenario.

Optionally, in a case that the target UE is remote UE, the radio frequency unit 101 is configured to send the Uu-segment QoS information and the PC5-segment QoS information to relay UE, where the Uu-segment QoS information is used by the relay UE to establish a corresponding Uu-segment QoS flow in a PDU session establishment or modification procedure; and the PC5-segment QoS information is used by the relay UE to establish a corresponding PC5-segment QoS flow in a direct link modification procedure.

Optionally, in a case that the target UE is relay UE, the user input unit 107 is configured to receive the end-to-end QoS requirement information from remote UE; and the processor 110 is further configured to initiate a PDU session establishment or modification procedure based on the Uu-segment QoS information received by the user input unit 107 to establish a corresponding Uu-segment QoS flow, and the relay UE initiates a direct link modification procedure based on the PC5-segment QoS information to establish a corresponding PC5-segment QoS flow.

Optionally, the processor 110 is specifically configured to split the end-to-end QoS requirement information into the PC5-segment QoS information and the Uu-segment QoS information based on a first mapping relationship or first information, where the first mapping relationship includes a mapping relationship between the end-to-end QoS requirement information and the PC5-segment QoS information and Uu-segment QoS information; and the first information includes a QoS parameter of a PC5 interface and a QoS parameter of a Uu interface that are detected by the target UE.

When the terminal 100 is relay UE, the processor 110 is configured to receive the end-to-end QoS requirement information from remote UE; and the processor 110 is further configured to send the end-to-end QoS requirement information to a target core network device.

Figure 21:
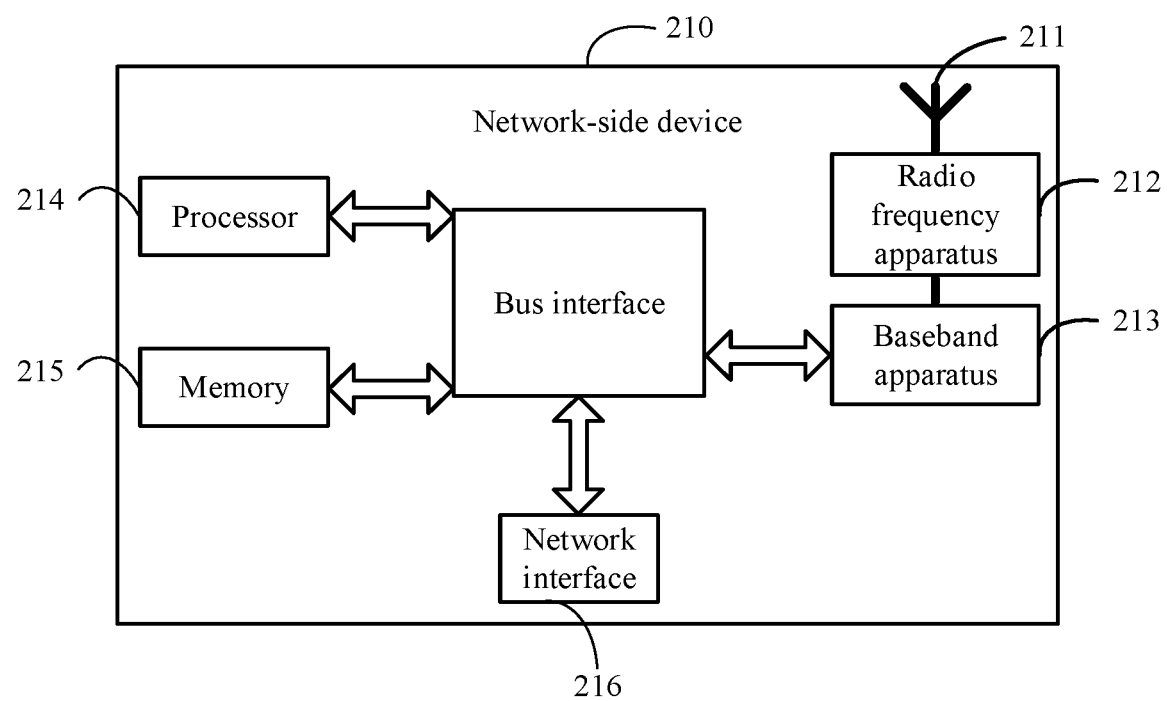
FIG. 21 is a schematic diagram of a network-side device according to an embodiment of this disclosure.

Specifically, an embodiment of this disclosure further provides a network-side device. As shown in FIG. 21, the network-side device 210 includes an antenna 211, a radio frequency apparatus 212, and a baseband apparatus 213. The antenna 211 is connected to the radio frequency apparatus 212. In an uplink direction, the radio frequency apparatus 212 receives information by using the antenna 211, and sends the received information to the baseband apparatus 213 for processing. In a downlink direction, the baseband apparatus 213 processes to-be-sent information, and sends the information to the radio frequency apparatus 212; and the radio frequency apparatus 212 processes the received information and then sends the information out by using the antenna 211.

The radio frequency apparatus may be located in the baseband apparatus 213. The method performed by the network-side device in the foregoing embodiment may be implemented in the baseband apparatus 213, and the baseband apparatus 213 includes a processor 214 and a memory 215.

The baseband apparatus 213 may include, for example, at least one baseband processing unit, where a plurality of chips are disposed on the baseband processing unit. As shown in FIG. 21, one of the chips is, for example, the processor 214, connected to the memory 215, to invoke a program in the memory 215 to perform the operation of the network device shown in the foregoing method embodiment.

The baseband apparatus 213 may further include a network interface 216, configured to exchange information with the radio frequency apparatus 212, where the interface is, for example, a common public radio interface (CPRI).

Specifically, the network-side device in this embodiment of this disclosure further includes a program or instructions stored in the memory 215 and capable of running on the processor 214. When the processor 214 invokes the program or instructions in the memory 215, the method performed by each module shown in FIG. 14 to FIG. 18 is performed, with the same technical effect achieved. To avoid repetition, details are not described herein again.

An embodiment of this disclosure further provides a readable storage medium. The readable storage medium stores a program or instructions. When the program or instructions are executed by a processor, each process of the foregoing method embodiment for splitting end-to-end QoS requirement information is implemented, with the same technical effect achieved. To avoid repetition, details are not described herein again.

The processor is a processor in the terminal in the foregoing embodiment. The readable storage medium includes a computer-readable storage medium, for example, a computer read-only memory (ROM), a random access memory (RAM), a magnetic disk, or an optical disc.

In addition, an embodiment of this disclosure provides a chip. The chip includes a processor and a communications interface. The communications interface is coupled to the processor. The processor is configured to run a program or instructions on a network-side device to implement each process of the foregoing method embodiment for splitting end-to-end QoS requirement information, with the same technical effect achieved. To avoid repetition, details are not described herein again.

It should be understood that the chip provided in this embodiment of this disclosure may also be referred to as a system-level chip, a system chip, a chip system, a system-on-chip, or the like.

In addition, an embodiment of this disclosure provides a computer program product. The program product is stored in a non-volatile storage medium, and the program product is executed by at least one processor to implement each process of the foregoing method embodiment for splitting end-to-end QoS requirement information, with the same technical effect achieved. To avoid repetition, details are not described herein again.

It should be noted that in this specification, the term "comprise", "include", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element. In addition, it should be noted that the scope of the method and apparatus in the implementations of this disclosure is not limited to performing the functions in an order shown or discussed, and may further include performing the functions in a substantially simultaneous manner or in a reverse order depending on the functions used. For example, the method described may be performed in an order different from that described, and various steps may be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary general hardware platform, and certainly may alternatively be implemented by using hardware. However, in most cases, the former is a preferred implementation. Based on such an understanding, the technical solutions of this disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific implementations. The foregoing specific implementations are merely illustrative rather than restrictive. Inspired by this disclosure, a person of ordinary skill in the art may develop many other forms without departing from principles of this disclosure and the protection scope of the claims, and all such forms fall within the protection scope of this disclosure.

What is claimed is:

1. A method for splitting end-to-end quality of service (Qos) requirement information, wherein the method comprises:

splitting, by a target device, end-to-end QoS requirement information into PC5-segment QoS information and Uu-segment QoS information, wherein the target device comprises at least one of a target UE and an access network device;

wherein the splitting, by a target device, end-to-end QoS requirement information into PC5-segment QoS information and Uu-segment QoS information comprises:

splitting, by the target UE, the end-to-end QoS requirement information into the PC5-segment QoS information and the Uu-segment QoS information based on a first mapping relationship or first information, wherein the first mapping relationship comprises a mapping relationship between the end-to-end QoS requirement information and the PC5-segment QoS information and Uu-segment QoS information; and the first information comprises a QoS parameter of a PC5 interface and a QoS parameter of a Uu interface that are detected by the target UE.

2. The method according to claim 1, wherein the PC5-segment QoS information comprises a PC5-segment QoS parameter and a PC5-segment QoS attribute, the PC5-segment QoS parameter comprises a PC5 QoS identifier PQI, and the PC5-segment QoS attribute comprises a PDB; and the Uu-segment QoS information comprises a Uu-segment QoS parameter and a Uu-segment QoS attribute, the Uu-segment QoS parameter comprises a 5G QoS identifier 5QI, and the Uu-segment QoS attribute comprises a PDB.

3. The method according to claim 1, wherein the PC5-segment QoS information and the Uu-segment QoS information satisfy the end-to-end QoS requirement information.

4. The method according to claim 3, wherein in a case that the target UE is relay UE, before the splitting, by a target device, end-to-end QoS requirement information into PC5-segment QoS information and Uu-segment QoS information, the method further comprises:

receiving, by the relay UE, the end-to-end QoS requirement information from remote UE; and after the splitting, by a target device, end-to-end QoS requirement information into PC5-segment QoS information and Uu-segment QoS information, the method further comprises:

initiating, by the relay UE, a PDU session establishment or modification procedure based on the Uu-segment QoS information to establish a corresponding Uu-segment QoS flow, and initiating, by the relay UE, a direct link modification procedure based on the PC5-segment Qos information to establish a corresponding PC5-segment QoS flow.

5. The method according to claim 3, wherein in a case that the target UE is a remote UE, after the splitting, by a target device, end-to-end QoS requirement information into PC5-segment QoS information and Uu-segment QoS information, the method further comprises:

sending, by the remote UE, the Uu-segment QoS information and the PC5-segment QoS information to a relay UE, wherein the Uu-segment QoS information is used by the relay UE to establish a corresponding Uu-segment QoS flow in a PDU session establishment or modification procedure; and the PC5-segment QoS information is used by the relay UE to establish a corresponding PC5-segment Qos flow in a direct link modification procedure.

6. The method according to claim 1, wherein the first mapping relationship is configured by a network side or preconfigured.

7. The method according to claim 1, wherein in a case that the target device is the access network device, after the splitting, by a target device, end-to-end QoS requirement information into PC5-segment QoS information and Uu-segment QoS information, the method further comprises:

establishing, by the access network device, a PC5-segment bearer based on the PC5-segment QoS information, and establishing a Uu-segment bearer based on the Uu-segment Qos information.

8. The method according to claim 1, wherein in a case that the target device is the access network device, the splitting, by a target device, end-to-end QoS requirement information into PC5-segment QoS information and Uu-segment QoS information comprises:

splitting, by the access network device, the end-to-end QoS requirement information into the PC5-segment QoS information and the Uu-segment QoS information based on a second mapping relationship or second information, wherein the second mapping relationship comprises a mapping relationship between the end-to-end QoS requirement information and the PC5-segment QoS information and Uu-segment QoS information; and the second information comprises a QoS parameter of a PC5 interface and a Qos parameter of a Uu interface that are detected by the access network device.

9. A method for splitting end-to-end QoS requirement information, wherein the method comprises:

splitting, by a target core network device, end-to-end QoS requirement information to obtain PC5-segment QoS information and Uu-segment QoS information; and before the splitting, by a target core network device, end-to-end QoS requirement information, receiving the end-to-end QoS requirement information from relay UE, wherein the end-to-end QoS requirement information is sent by remote UE to the relay UE; or after the splitting, by a target core network device, end-to-end QoS requirement information, sending the PC5-segment QoS information and the Uu-segment QoS information to an access network device, wherein the PC5-segment QoS information comprises a PC5-segment QoS parameter and a PC5-segment QoS attribute, the PC5-segment QoS parameter comprises a PQI, and the PC5-segment QoS attribute comprises a PDB; and the Uu-segment QoS information comprises a Uu-segment QoS parameter and a Uu-segment QoS attribute, the Uu-segment QoS parameter comprises a 5QI, and the Uu-segment QoS attribute comprises a PDB;

wherein the target core network device comprises a first core network device and a second core network device, and the splitting, by a target core network device, end-to-end Qos requirement information to obtain PC5-segment QoS information and Uu-segment QoS information comprises:

splitting, by the first core network device, the end-to-end QoS requirement information to obtain the PC5-segment QoS information and a first rule; and sending, by the first core network device, the PC5-segment QoS information and the first rule to the second core network device, wherein the first rule is used by the second core network device to generate the Uu-segment QoS information.

10. The method according to claim 9, wherein the splitting, by the first core network device, the end-to-end QoS requirement information to obtain the PC5-segment QoS information and a first rule comprises:

splitting, by the first core network device, the end-to-end QoS requirement information based on target information to obtain the PC5-segment QoS information and the first rule, wherein
the target information comprises at least one of the following: subscription information of the remote UE, subscription information of the relay UE, a payment policy, relay communication policy information authorized by the remote UE, and relay communication policy information authorized by the relay UE.

11. The method according to claim 9, wherein in a case that the target core network device comprises a first core network device, the splitting, by a target core network device, end-to-end QoS requirement information to obtain PC5-segment QoS information and Uu-segment QoS information comprises:
splitting, by the first core network device, the end-to-end QoS requirement information to obtain a first rule and the PC5-segment QoS information.

12. The method according to claim 9, wherein in a case that the target core network device comprises a first core network device, the receiving the end-to-end Qos requirement information from relay UE comprises:
receiving, by the first core network device, the end-to-end QoS requirement information forwarded by the relay UE through a second core network device, wherein the end-to-end Qos requirement information is sent by the remote UE to the relay UE.

13. The method according to claim 9, wherein the target core network device comprises a second core network device, and before the sending the PC5-segment QoS information and the Uu-segment QoS information to an access network device, the splitting, by a target core network device, end-to-end QoS requirement information to obtain PC5-segment QoS information and Uu-segment QoS information comprises:
splitting, by the second core network device, the end-to-end QoS requirement information to obtain the PC5-segment QoS information and the Uu-segment QoS information.

14. The method according to claim 13, wherein the splitting, by the second core network device, the end-to-end QoS requirement information to obtain the PC5-segment Qos information and the Uu-segment QoS information comprises:
splitting, by the second core network device, the end-to-end QoS requirement information based on target information to obtain the PC5-segment QoS information and the Uu-segment QoS information, wherein
the target information comprises at least one of the following: subscription information of the remote UE, subscription information of the relay UE, a payment policy, relay communication policy information authorized by the remote UE, and relay communication policy information authorized by the relay UE.

15. The method according to claim 9, wherein the sending the PC5-segment QoS information and the Uu-segment QoS information to an access network device comprises:
sending, by the target core network device, the PC5-segment QoS information and the Uu-segment QoS information to the access network device in a PDU session establishment procedure and a direct link modification procedure.

16. The method according to claim 9, wherein the PC5-segment QoS information comprises a PC5-segment QoS text, and the Uu-segment QoS information comprises a Uu-segment QoS text.

17. A terminal, comprising a processor, a memory, and a program or instructions stored in the memory and capable of running on the processor, wherein when the program or instructions are executed by the processor, the processor is configured to implement the following steps:
splitting end-to-end QoS requirement information into PC5-segment QoS information and Uu-segment QoS information;
wherein the splitting end-to-end QoS requirement information into PC5-segment QoS information and Uu-segment QoS information comprises:
splitting the end-to-end QoS requirement information into the PC5-segment Qos information and the Uu-segment QoS information based on a first mapping relationship or first information, wherein
the first mapping relationship comprises a mapping relationship between the end-to-end QoS requirement information and the PC5-segment QoS information and Uu-segment QoS information; and
the first information comprises a QoS parameter of a PC5 interface and a QoS parameter of a Uu interface that are detected by the terminal.

18. The terminal according to claim 17, wherein the PC5-segment QoS information and the Uu-segment QoS information satisfy the end-to-end QoS requirement information.

19. The terminal according to claim 18, wherein in a case that the terminal is relay UE, before the splitting end-to-end QoS requirement information into PC5-segment Qos information and Uu-segment QoS information, the following steps are further implemented:
receiving, by the relay UE, the end-to-end QoS requirement information from remote UE; and
after the splitting end-to-end QoS requirement information into PC5-segment Qos information and Uu-segment QoS information, the following steps are further implemented:
initiating, by the relay UE, a PDU session establishment or modification procedure based on the Uu-segment QoS information to establish a corresponding Uu-segment QoS flow, and initiating, by the relay UE, a direct link modification procedure based on the PC5-segment QoS information to establish a corresponding PC5-segment QoS flow.

* * * * *